US011916326B2

(12) United States Patent
Ito

(10) Patent No.: US 11,916,326 B2
(45) Date of Patent: Feb. 27, 2024

(54) PLUG CONNECTOR AND CONNECTOR SET HAVING SAME, AND METHOD FOR REMOVING CONNECTOR SET

(71) Applicant: Panasonic Intellectual Property Management Co., Ltd., Osaka (JP)

(72) Inventor: Chikara Ito, Mie (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 88 days.

(21) Appl. No.: 17/632,478

(22) PCT Filed: Jun. 5, 2020

(86) PCT No.: PCT/JP2020/022411
§ 371 (c)(1),
(2) Date: Feb. 2, 2022

(87) PCT Pub. No.: WO2021/024602
PCT Pub. Date: Feb. 11, 2021

(65) Prior Publication Data

US 2022/0285868 A1 Sep. 8, 2022

(30) Foreign Application Priority Data

Aug. 2, 2019 (JP) ................................ 2019-143110

(51) Int. Cl.
*H01R 12/79* (2011.01)
*H01R 12/77* (2011.01)
*H01R 13/627* (2006.01)

(52) U.S. Cl.
CPC .......... *H01R 12/79* (2013.01); *H01R 12/774* (2013.01); *H01R 13/6272* (2013.01)

(58) Field of Classification Search
CPC ........... H01R 13/6272; H01R 13/6275; H01R 12/79; H01R 12/774
(Continued)

(56) References Cited

U.S. PATENT DOCUMENTS 7,488,190 B2 * 2/2009 Takahashi ........... H01R 13/633 439/372
8,678,850 B2 * 3/2014 Nagasaka .......... H01R 13/6272 439/378
(Continued)

FOREIGN PATENT DOCUMENTS

JP 2015-210918 A 11/2015
JP 2017-069091 A 4/2017
(Continued)

OTHER PUBLICATIONS

Extended European Search Report issued In corresponding European Patent Application No. 20850928.1, dated Aug. 23, 2022.
(Continued)

*Primary Examiner* — Gary F Paumen
(74) *Attorney, Agent, or Firm* — Rimon, P.C.

(57) ABSTRACT

A plug connector includes a housing and multiple plug terminals. The housing has at least a base portion housing the multiple plug terminals, and a lock mechanism, and a pair of side portions each provided on both right and left sides of the base portion. At each of the side portions in a pair, a step portion is formed. In a state in which the plug connector is fitted in the receptacle connector, side surfaces of the step portions face the receptacle connector through a clearance, and front surfaces of the side portions are closer to the receptacle connector than the side surfaces of the step portions are to the receptacle connector.

8 Claims, 18 Drawing Sheets

(58) Field of Classification Search
USPC .................................................. 439/352, 358
See application file for complete search history.

(56) References Cited

U.S. PATENT DOCUMENTS

| | | | | |
|---|---|---|---|---|
| 10,707,622 | B2 * | 7/2020 | Ito ........................ | H01R 13/639 |
| 10,826,241 | B2 * | 11/2020 | Ito ........................ | H01R 13/639 |
| 2007/0054544 | A1 | 3/2007 | Hirata | |
| 2017/0324179 | A1 | 11/2017 | Ito et al. | |
| 2017/0331224 | A1 | 11/2017 | Ebisawa | |
| 2019/0334286 | A1 * | 10/2019 | Ito .......................... | H01R 13/42 |
| 2019/0334287 | A1 | 10/2019 | Ito | |
| 2020/0161801 | A1 | 5/2020 | Chiba et al. | |

FOREIGN PATENT DOCUMENTS

| | | | |
|---|---|---|---|
| JP | 2017-069091 | A | 4/2017 |
| JP | 2017-204399 | A | 11/2017 |
| JP | 2018-206466 | A | 12/2018 |
| JP | 2019-016486 | A | 1/2019 |
| WO | 2016/088308 | A1 | 6/2016 |

OTHER PUBLICATIONS

International Search Report issued in International Patent Application No. PCT/JP2020/022411, dated Aug. 11, 2020, with partial English translation.

* cited by examiner

PLUG CONNECTOR AND CONNECTOR SET HAVING SAME, AND METHOD FOR REMOVING CONNECTOR SET

CROSS-REFERENCE OF RELATED APPLICATIONS

This application is the U.S. National Phase under 35 U.S.C. § 371 of International Patent Application No. PCT/JP2020/022411, filed on Jun. 5, 2020, which in turn claims the benefit of Japanese Application No. 2019-143110, filed on Aug. 2, 2019, the entire disclosures of which Applications are incorporated by reference herein.

TECHNICAL FIELD

The present disclosure relates to a plug connector, a connector set including the plug connector, and the method for removing the connector set.

BACKGROUND ART

Typically, a connector set has been known, in which a plug connector connected to a sheet-shaped cable such as a flexible printed circuit (hereinafter referred to as an FPC) is fitted in a box-shaped receptacle connector by insertion of the plug connector into an opening of the receptacle connector. For example, an electronic component or a circuit board connected to the FPC and an electronic component or a circuit board connected to the receptacle connector are electrically connected to each other through the connector set (see, e.g., Patent Documents 1 to 4).

CITATION LIST

Patent Document

PATENT DOCUMENT 1: International Patent Publication No. 2016/088308

PATENT DOCUMENT 2: Japanese Unexamined Patent Publication No. 2017-204399

PATENT DOCUMENT 3: Japanese Unexamined Patent Publication No. 2018-206466

PATENT DOCUMENT 4: Japanese Unexamined Patent Publication No. 2019-016486

SUMMARY OF THE INVENTION

Technical Problem

With size reduction in electric equipment, a circuit board provided therein, etc., a further size reduction in a connector set has been recently demanded. With diversification of signals to be exchanged between circuit boards, more pins have been demanded for the connector set.

Meanwhile, due to size reduction in the connector set and an increase in the number of pins in the connector set, a difficulty in removal of a plug connector from a receptacle connector has been increased.

The present disclosure has been made in view of the above-described points, and an object of the present disclosure is to provide a plug connector easily removable from a receptacle connector, a connector set including the plug connector, and the method for removing the connector set.

Solution to the Problem

For achieving the above-described object, the plug connector according to the present disclosure is a plug connector to be fitted in a receptacle connector, the plug connector including a housing and multiple plug terminals arranged in the housing. The housing has at least abase portion housing the multiple plug terminals, a lock mechanism configured to be stopped at the receptacle connector when fitted in the receptacle connector, and a pair of side portions each provided on both right and left sides of the base portion. At least one of the pair of side portions has a first surface extending upward and a second surface positioned forward of a back surface of the base portion and backward of the first surface and extending upward. In a state in which the plug connector is fitted in the receptacle connector, the second surface faces the receptacle connector through a clearance, and the first surface is closer to the receptacle connector than the second surface is to the receptacle connector.

The connector set according to the present disclosure is a connector set including the plug connector and the receptacle connector connected to each other. The receptacle connector has at least a box-shaped body having an opening at a back surface, and the multiple receptacle terminals arranged in the opening of the body. A stopping portion at which the lock mechanism is stoppable is provided at an inner wall surface positioned at an upper portion of the body. In a state in which the plug connector is housed in the body, the multiple plug terminals are each electrically connected to the multiple receptacle terminals.

The method for removing the connector set according to the present disclosure includes the tool arrangement step of setting a tool with a predetermined shape to the housing such that the tool is parallel with an upper surface of the base portion, and the unlocking step of releasing the lock mechanism and the stopping portion provided at the body from each other by inserting part of the tool along the second surface and pressing down the lock mechanism by the tool.

Advantages of the Invention

According to the plug connector of the present disclosure, the plug connector can be easily removed from the receptacle connector in such a manner that the tool is operated in contact with step portions.

According to the connector set of the present disclosure, insertion/removal of the plug connector is facilitated, and an electric circuit can be easily formed.

According to the method for removing the connector set according to the present disclosure, the plug connector can be easily removed from the receptacle connector.

DESCRIPTION OF EMBODIMENTS

Hereinafter, embodiments of the present disclosure will be described in detail based on the drawings. Description of the preferred embodiments below is merely an example in nature, and is not intended to limit the scope, application, or use of the present disclosure.

(Embodiment)

[Configuration of Connector Set]

Figure 1:
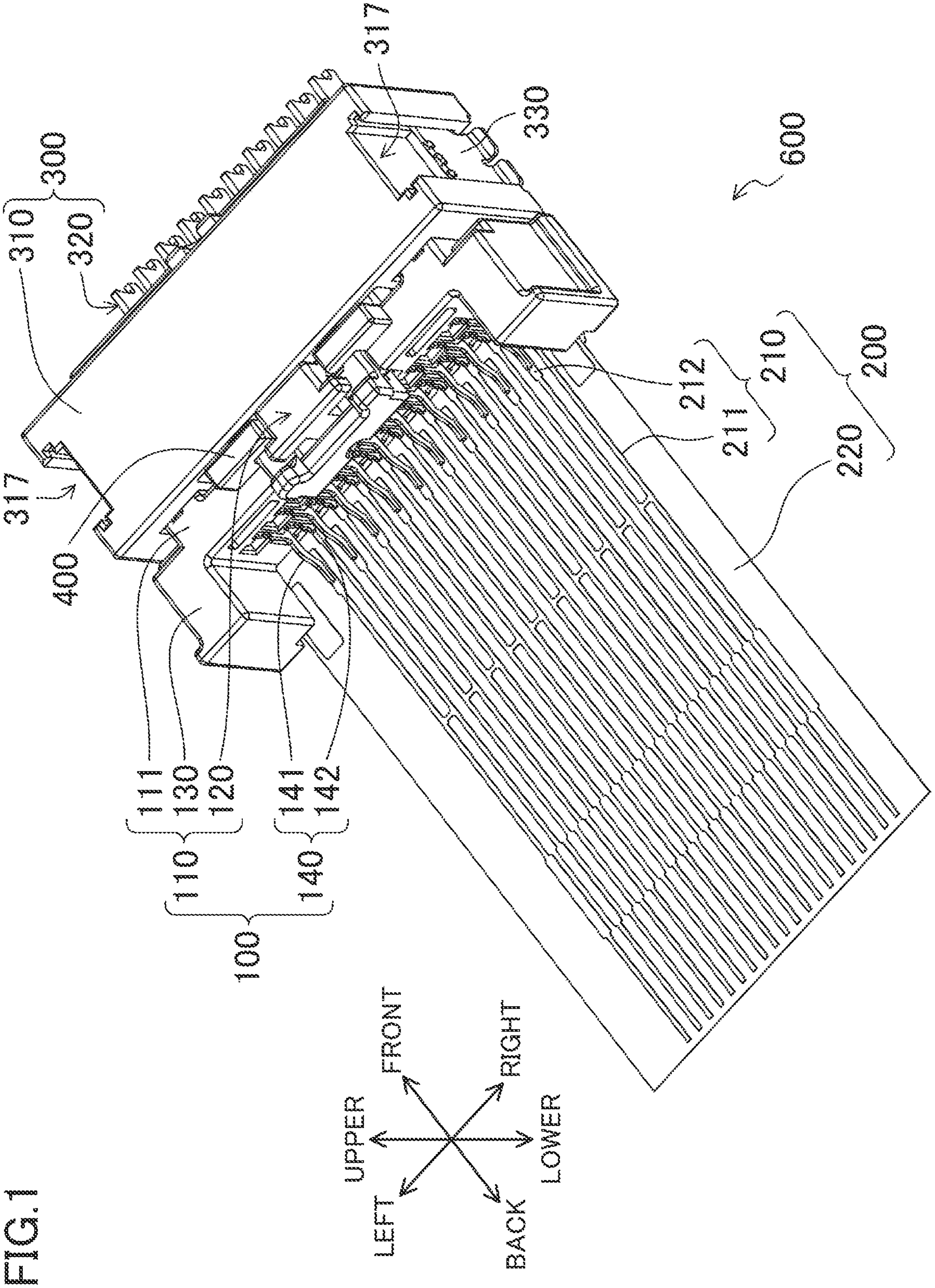
FIG. 1 is a perspective view of a connector set according to one embodiment.
Figure 2:
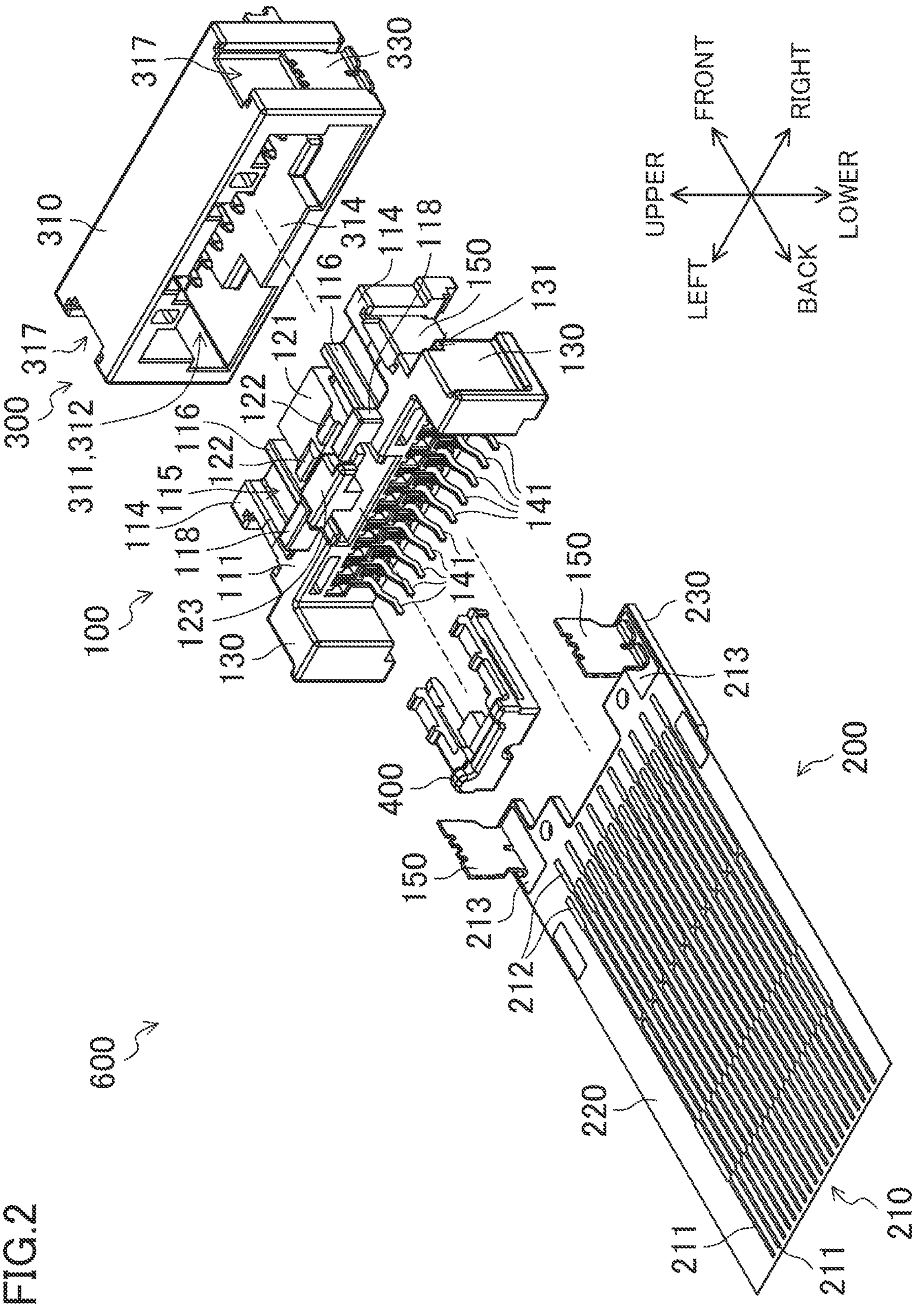
FIG. 2 is an exploded perspective view of the connector set.

FIG. 1 shows a perspective view of a connector set according to the present embodiment, and FIG. 2 shows an exploded perspective view of the connector set. Note that in description below, an insertion/removal direction of a receptacle connector 300 and a plug connector 100 in FIG. 1 will be sometimes referred to as a front-back direction, an array direction of a conductor pattern 210 of an FPC 200 will be sometimes referred to as a right-left direction, and a direction perpendicular to the front-back direction and the right-left direction will be sometimes referred to as an upper-lower direction. Moreover, in the front-back direction, a side on which the receptacle connector 300 is arranged will be sometimes referred to as forward or front, and the opposite side on which the plug connector 100 is arranged will be sometimes referred to as backward or back. In the upper-lower direction, a side on which a connector position assurance device 400 (hereinafter referred to as a CPA 400) is arranged will be sometimes referred to as upward or upper, and the opposite side on which a reinforcement plate 230 is arranged will be sometimes referred to as downward or lower.

In the drawings described below, an insulating film covering the conductor pattern 210 from above is not shown for the sake of visibility of the conductor pattern 210 of the FPC 200.

As shown in FIGS. 1 and 2, a connector set 600 includes the plug connector 100, the receptacle connector 300, and the CPA 400. The FPC 200 is connected to the back of the plug connector 100, and the front of the plug connector 100 is fitted in the receptacle connector 300. In the receptacle connector 300, multiple plug terminals 140 (see FIG. 4) provided at the plug connector 100 each contact multiple receptacle terminals 320 (see FIG. 7) provided at the receptacle connector 300, thereby electrically connecting the plug connector 100 and the receptacle connector 300 to each other. Moreover, multiple connection terminals 212 provided at the FPC 200 are each connected to the multiple plug terminals 140.

With this configuration, a circuit board (not shown) connected to a back end side of the FPC 200 or an electronic component (not shown) mounted thereon is electrically connected to a circuit board (not shown) connected to the receptacle connector 300 or an electronic component (not shown) mounted thereon through the connector set 600, thereby forming an electric circuit.

[Configuration of Plug Connector]

Figure 3A:
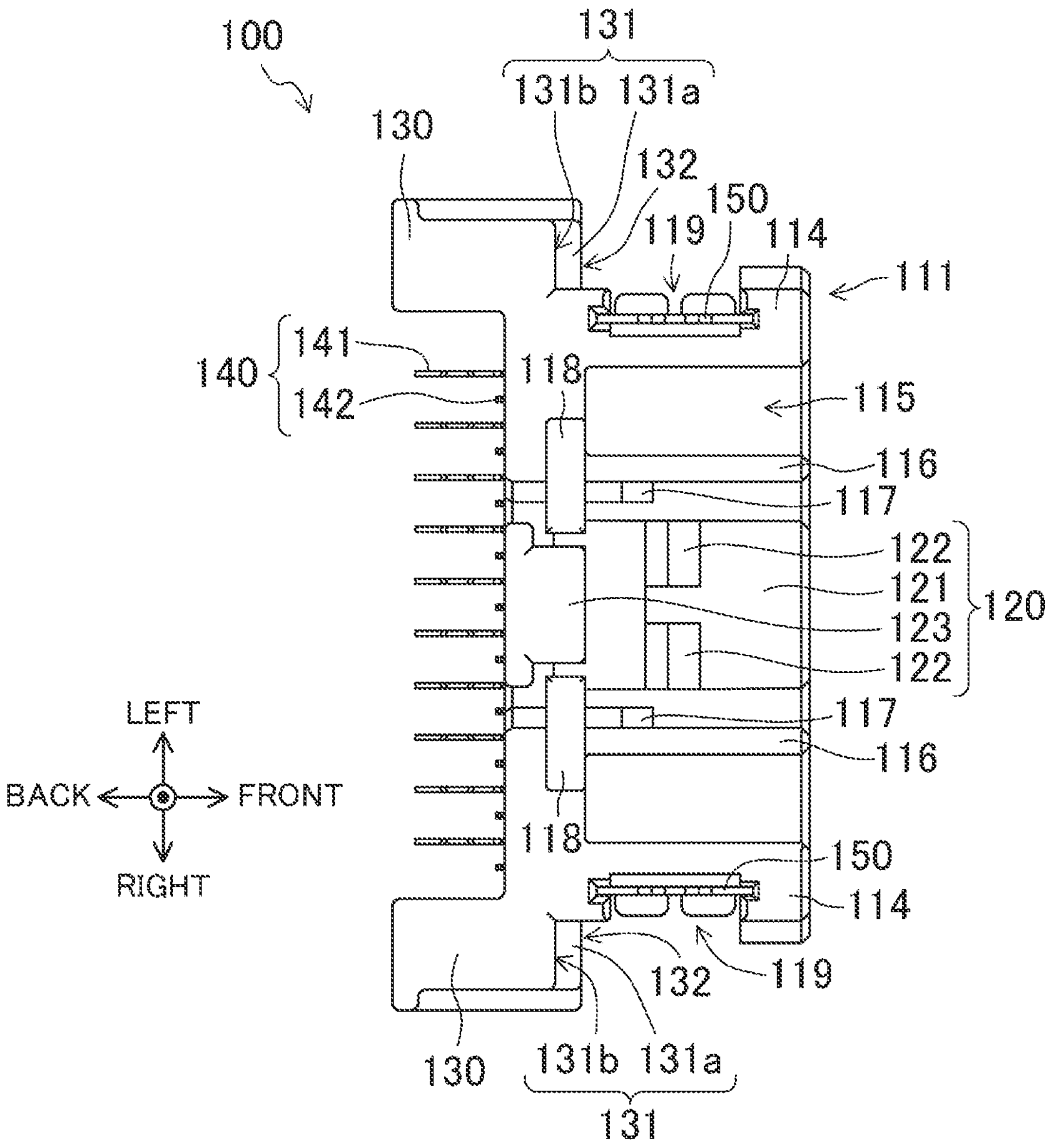
FIG. 3A is a plan view of a plug connector.
Figure 3B:
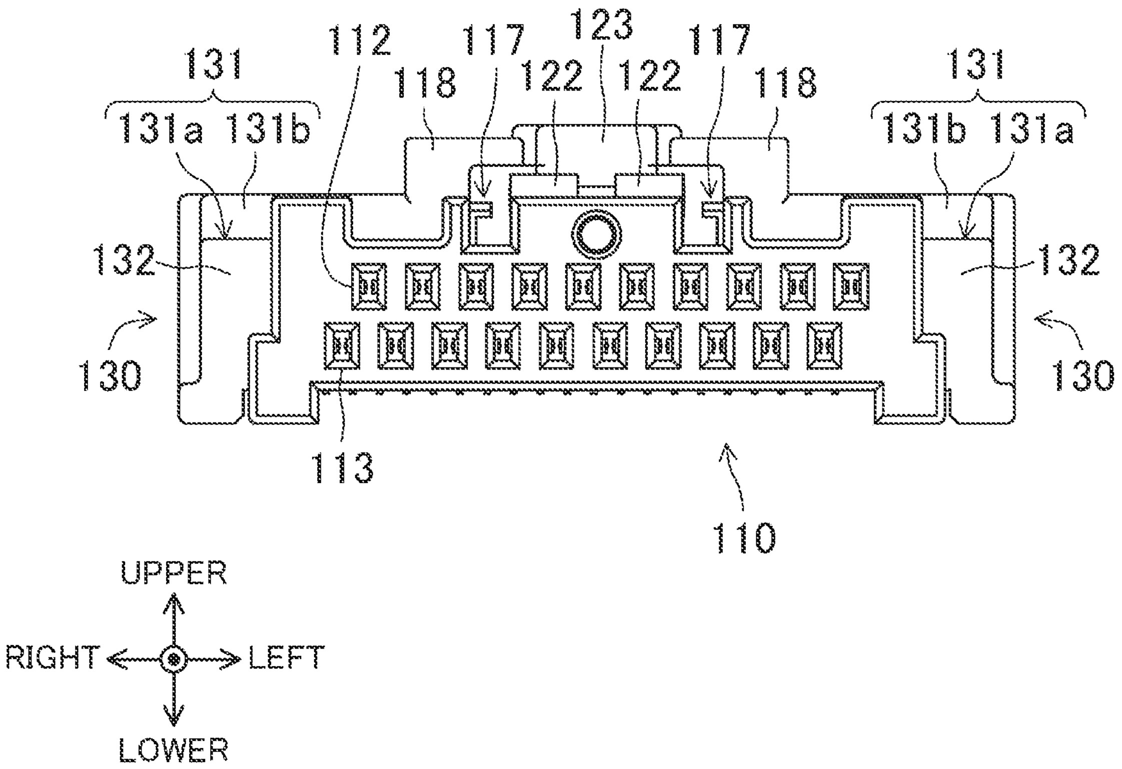
FIG. 3B is a view of a housing from the front.
Figure 3C:
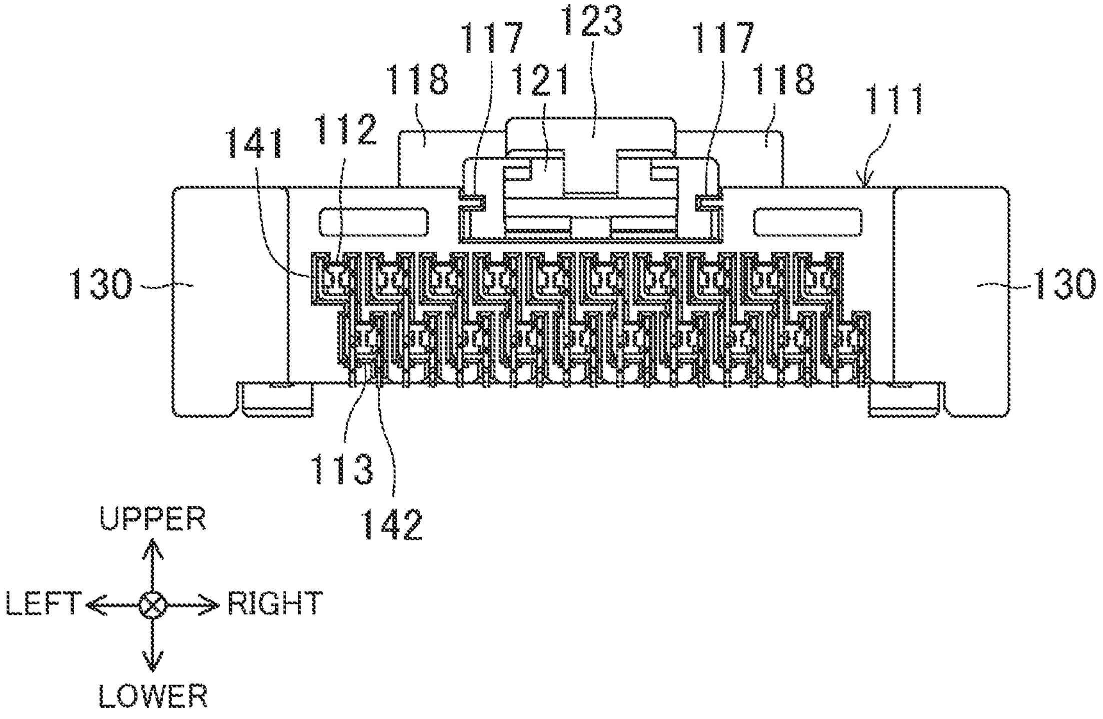
FIG. 3C is a view of the plug connector from the back.
Figure 3D:
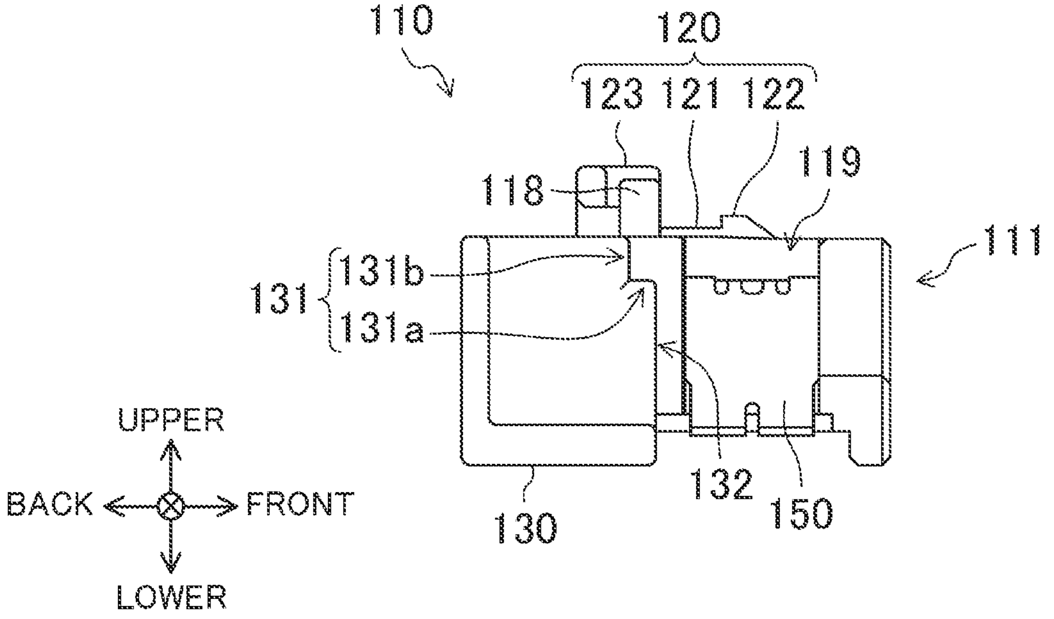
FIG. 3D is a right side view of the housing.
Figure 4:
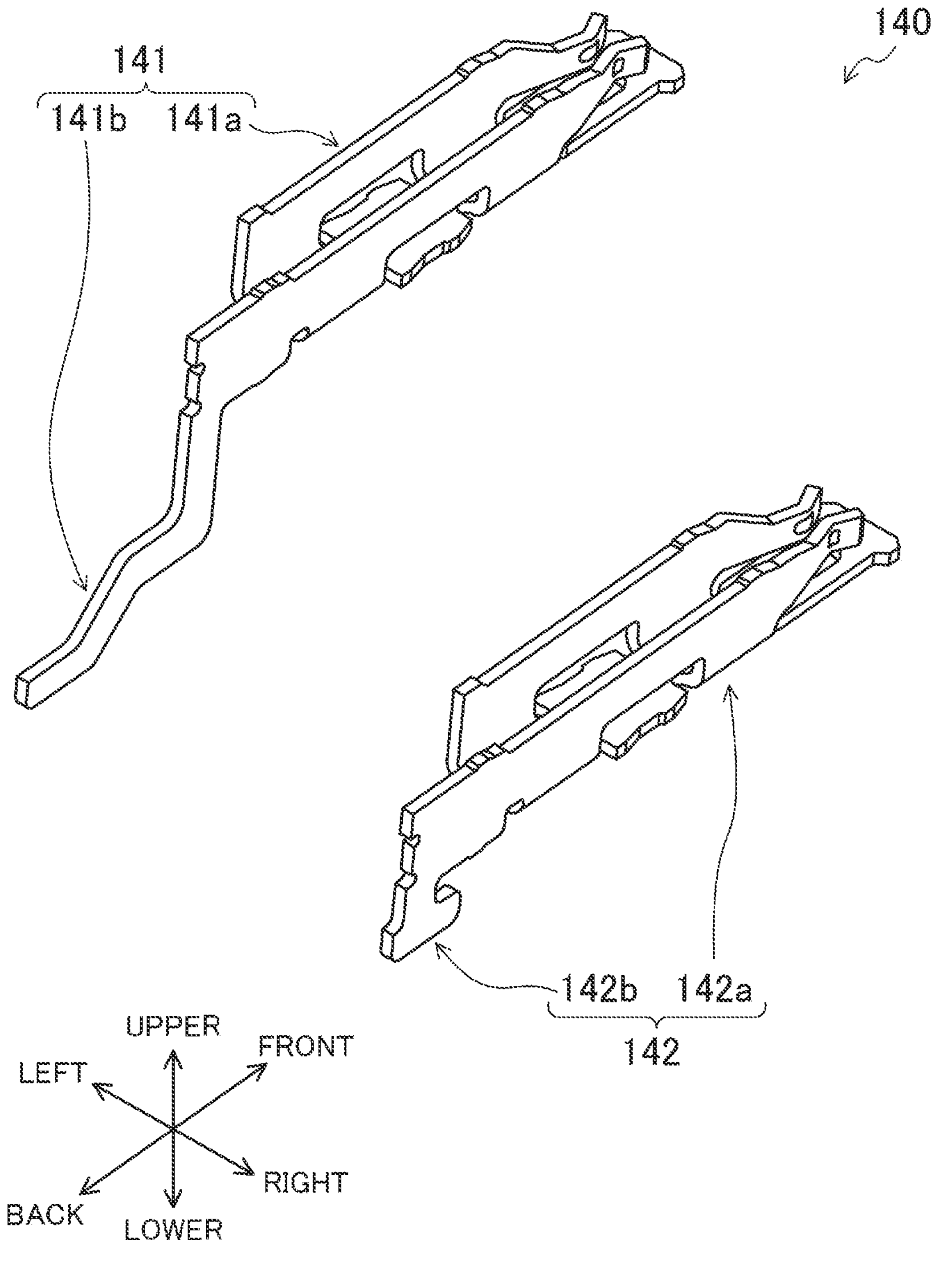
FIG. 4 is a perspective view of a plug terminal.

FIG. 3A shows a plan view of the plug connector, FIG. 3B shows a view of a housing from the front, FIG. 3C shows a view of the plug connector from the back, and FIG. 3D shows a right side view of the housing. Moreover, FIG. 4 shows a perspective view of the plug terminal. Note that for the sake of convenience in description, FIGS. 3A to 3D show a state in which fixing tools 150 are attached to the housing 110.

As shown in FIGS. 1 to 3D, the plug connector 100 has the housing 110 and the multiple plug terminals 140. In the present embodiment, the array of the plug terminals 140 is a zigzag array including 20 pins in total and having upper and lower two rows. However, the present disclosure is not limited to above, and other arrays may be employed as necessary.

The housing 110 is a component molded from a resin material, and has a base portion 111, a lock mechanism 120, and a pair of side portions 130.

As shown in FIGS. 3B and 3C, multiple upper terminal housing portions 112 and multiple lower terminal housing portions 113 penetrating the base portion 111 in the front-back direction from a front surface to a back surface are formed at the base portion 111. The multiple upper terminal housing portions 112 are provided at 10 locations at predetermined intervals in the right-left direction at the base portion 111, and upper plug terminals 141 are each housed in the multiple upper terminal housing portions 112. Moreover, a coupling portion 141*b* (see FIG. 4) on a base end side of the upper plug terminal 141 protrudes outward of the back surface of the base portion 111, and is connected to the connection terminal 212 (see FIGS. 1 and 5A) of the FPC 200. Similarly, the multiple lower terminal housing portions 113 are provided at 10 locations at predetermined intervals in the right-left direction at the base portion 111, and lower plug terminals 142 are each housed in the multiple lower terminal housing portions 113. Moreover, a coupling portion 142*b* (see FIG. 4) on a base end side of the lower plug terminal 142 protrudes outward of the back surface of the base portion 111, and is connected to the connection terminal 212 (see FIGS. 1 and 5A) of the FPC 200. Note that the lower terminal housing portion 113 is provided with a clearance from the upper terminal housing portion 112 in the upper-lower direction, and as viewed from the front, the multiple upper terminal housing portions 112 and the multiple lower terminal housing portions 113 are arrayed in two rows in a zigzag pattern.

Moreover, fixing tool support portions 119 are formed at both right and left side surfaces of the base portion 111. The fixing tool 150 is a component formed in such a manner that a plate-shaped metal member is bent downward. In a state in which the fixing tool 150 is attached to the fixing tool support portion 119 of the base portion 111, a lower surface of the fixing tool 150 is parallel with a lower surface of the base portion 111. Moreover, in this state, a side surface of the fixing tool 150 contacts the side surface of the base portion 111.

Note that in the specification of the present application, a term "parallel" means parallel including a processing tolerance or an assembly tolerance of each component, and does not mean that both components are precisely parallel with each other or the same as each other. Similarly, a term "same" or "equal" means same or equal including a processing tolerance or an assembly tolerance of each component, and does not mean that both components targeted for comparison are precisely the same as each other or equal to each other. A term "flush" means that surfaces targeted for comparison are, including a processing tolerance or an assembly tolerance of each component, flush with each other, and does not mean that each surface is precisely positioned in the same plane.

A pair of slits into which the fixing tool 150 is to be inserted is provided at the fixing tool support portion 119. A side end portion of the fixing tool 150 is inserted into the slits, and in this manner, the fixing tool 150 is attached to the fixing tool support portion 119. Moreover, the fixing tool 150 attached to the fixing tool support portion 119 is, by, e.g., soldering, connected to a coupling terminal 213 (see FIGS. 1 and 5A) of the FPC 200, and accordingly, the plug connector 100 is firmly fixed to the FPC 200.

As shown in FIGS. 2 and 3A, recessed portions 115 are formed at an upper surface of the base portion 111. Such a recessed portion 115 opens forward, and a pair of peripheral wall portions 114 surrounding the recessed portions 115 is in a substantially L-shape as viewed from above. Note that the peripheral wall portions 114 in a pair are provided symmetrical with each other in the right-left direction at the base portion 111 as viewed above. Moreover, the peripheral wall portions 114 in a pair are provided with a predetermined clearance in the right-left direction. Two ribs 116 are, inside the recessed portions 115, provided with a predetermined clearance in the right-left direction. The rib 116 extends upward of a bottom surface of the recessed portion 115, and extends in the front-back direction from a front end to aback end of the recessed portion 115. Note that upper surfaces of the peripheral wall portions 114 and the bottom surfaces of the recessed portions 115 form part of the upper surface of the base portion 111.

As shown in FIGS. 3A to 3C, guide portions 117 are provided inside the two ribs 116. An upper end portion of the guide portion 117 extends inward along the right-left direction. Of the guide portion 117, a back surface is flush with a back surface of the peripheral wall portion 114, and a front surface is positioned inside the recessed portion 115 as viewed from above. The guide portion 117 has the function of housing a lower arm 420 (see FIG. 8) of the CPA 400 to guide the CPA 400 to a predetermined position.

A pair of lever protection portions 118 for protecting a later-described lever is provided on the upper surfaces of the peripheral wall portions 114. The lever protection portion 118 is provided to extend upward of the vicinity of an inner wall surface at the back of the peripheral wall portion 114 and further extend inward along the right-left direction. The lever protection portion 118 is in a substantially L-shape as viewed from the front. Moreover, the lever protection portions 118 are provided symmetric with each other in the right-left direction on the base portion 111 as viewed from above. A portion between an upper surface of the guide portion 117 and a lower surface of a portion, which extends right and left, of the lever protection portion 118 is formed as a space for housing an upper arm 410 (see FIG. 8) of the CPA 400. Moreover, the lock mechanism 120 is a component coupled to the front of the base portion 111, specifically a front end side of the bottom surfaces of the recessed portions 115, and supported in a cantilever manner, and is molded integrally with the base portion 111. The lock mechanism 120 has a lever 121, hooks 122, and a release button 123.

The lever 121 is provided to extend upward of the front end side of the bottom surfaces of the recessed portions 115 and further extend backward until reaching a portion between the lever protection portions 118 in a pair. That is, the lever 121 is supported on the base portion 11 in a cantilever manner. Moreover, a back surface, i.e., a tip end surface, of the lever 121 is positioned slightly forward of a back surface of the lever protection portion 118. The height of the lever 121 is the same as the height of the rib 116, and on the other hand, is lower than the height of the peripheral wall portion 114. That is, an upper surface of the lever 121 is at a position lower than the lower surface of the portion, which extends right and left, of the lever protection portion 118, and the lever 121 and the lever protection portion 118 are provided with a clearance in the upper-lower direction.

The hooks 122 are provided to protrude upward of the upper surface of the lever 121, and as viewed from above, are positioned at a center portion of the lever 121. Moreover, two hooks 122 are provided with a clearance along the right-left direction.

The release button 123 is provided to protrude upward of the upper surface of the lever 121, and as viewed from above, is positioned at a back end portion of the lever 121. The release button 123 projects, on a back end side thereof, to both right and left sides, and is in a substantially T-shape as viewed from above. Moreover, the release button 123 protrudes downward at a lower surface thereof, and is also in a substantially T-shape as viewed from the front. The lower surface of the release button 123 is provided with a clearance from the bottom surfaces of the recessed portions 115 in the upper-lower direction. Moreover, an upper surface of the release button 123 is flush with upper surfaces of the lever protection portions 118.

When the plug connector 100 is fitted in the receptacle connector 300, the two hooks 122 are hooked on hook receiving portions (stopping portions) 313 (see FIGS. 6A and 6C) provided at a body 310, and accordingly, the plug connector 100 is stopped at the receptacle connector 300. On the other hand, the release button 123 is pressed down, and in this manner, a tip end, i.e., the back, of the lever 121 is bent downward and the hooks 122 provided at the lever 121 are displaced downward accordingly. Thus, the hooks 122 and the hook receiving portions 313 are released from each other. In this manner, the plug connector 100 can be removed from the receptacle connector 300.

In some cases, when the release button 123 is erroneously operated to displace upward, the lever 121 is damaged. For avoiding such failure, the pair of lever protection portions 118 is provided on the housing 110 in the present embodiment, thereby preventing the lever 121 from displacing upward more than a predetermined amount.

The pair of side portions 130 is provided to project outward of a back end portion of the base portion 111 along the right-left direction and extend backward. A front surface 132 of each side portion 130 is positioned backward of the front surface of the base portion 111. Moreover, the pair of side portions 130 is provided on both right and left sides to surround a base end side of the multiple plug terminals 140. As in the lock mechanism 120, the side portions 130 are also molded integrally with the base portion 111. In a state in which the plug connector 100 is fitted in the receptacle connector 300, a portion of the base portion 111 at the front of the front surfaces 132 of the side portions 130 is housed in the body 310.

Two step portions 131 are formed on a front end side and an upper end side at the side portions 130. A bottom surface 131*a* of the step portion 131 extends backward continuously to the front surface 132 of the side portion 130.

On the other hand, a side surface 131*b* of the step portion 131 extends upward continuously to the bottom surface 131*a* of the step portion 131, and is formed continuously to an upper surface of the side portion 130. The side surface 131*b* of the step portion 131 is positioned forward of the back surface of the base portion III and backward of the front surface 132 of the side portion 130. Moreover, the side surface 131*b* of the step portion 131 and the front surface 132 of the side portion 130 are connected to each other through the bottom surface 131*a* extending forward of the side surface 131*b*. In other words, the step portion 131 is a recessed portion formed at the side portion 130 of the housing 110 and opening upward and forward.

Thus, in a state in which the plug connector 100 is fitted in the receptacle connector 300, the side surface 131*b* of the step portion 131 is at a position apart backward from the receptacle connector 300 than the front surface 132 of the side portion 130 is. Particularly, the plug connector 100 is fitted in the receptacle connector 300 such that the side surface 131*b* of the step portion 131 faces the receptacle connector 300 through a predetermined clearance.

Note that the height of the step portion 131 is the same as or slightly lower than the height of a housing pressing portion 540 (see FIG. 9) of a later-described removal tool 500 (hereinafter merely referred to as a tool 500). Moreover, the width of the step portion 131 in the front-back direction is the same as or slightly narrower than the thickness of the housing pressing portion 540. Further, a clearance between the side surface 131*b* of the step portion 131 and the receptacle connector 300 is wider than the thickness of the housing pressing portion 540.

The step portions 131 are formed at the side portion 130 positioned at the right of the release button 123 and the side portion 130 positioned at the left of the release button 123. A distance between the step portion 131 positioned at the right and the center of the release button 123 is preferably the same as or the substantially same as a distance between the step portion 131 positioned at the left and the center of the release button 123.

The step portion 131 may be, as viewed from above, positioned between the release button 123 and the guide portion 117. Moreover, the step portion 131 positioned at the right of the release button 123 may be positioned at a right end of the housing 110. In this case, the step portion 131 may be a recessed portion also opening rightward in addition to upward and forward. Similarly, the step portion 131 positioned at the left of the release button 123 may be positioned at a left end of the housing 110. In this case, the step portion 131 may be a recessed portion also opening leftward in addition to upward and forward Note that in the present embodiment, the step portion 131 is provided at each of both right and left side portions 130 of the housing 110, but a single step portion 131 or three or more step portions 131 may be provided at the housing 110. In the case of providing the single step portion 131, such a step portion 131 is preferably provided in the vicinity of the center of the housing 110. In the case of providing three or more step portions 131, these three or more step portions 131 are preferably arrayed in the right-left direction. Further, the three or more step portions 131 are, in the right-left direction, preferably arranged on a single axis along the right-left direction.

In a state in which the plug connector 100 is fitted in the receptacle connector 300, the front surfaces 132 of the side portions 130 contact a front surface of the body 310. That is, the front surfaces 132 of the side portions 130 come close to the receptacle connector 300 (specifically, the body 310). In other words, in a state in which the plug connector 100 is fitted in the receptacle connector 300, the front surfaces 132 of the side portions 130 face the receptacle connector 300 (specifically, the body 310).

Note that in a state in which the plug connector 100 is fitted in the receptacle connector 300, the front surfaces 132 may face the body 310 through a gap or may contact the body 310. Moreover, in a state in which the plug connector 100 is fitted in the receptacle connector 300, the front surfaces 132 may face the body 310 through a member arranged among the front surfaces 132 and the body 310.

As viewed from above, the front surfaces 132 of the side portions 130 are provided flush with a front surface of the release button 123. As viewed from the side, the upper surface of the side portion 130 is provided flush with the upper surface of the base portion 111, i.e., the upper surface of the peripheral wall portion 114 in this case.

As shown in FIG. 4, the multiple plug terminals 140 have the multiple upper plug terminals 141 housed in the upper terminal housing portions 112 and the multiple lower plug terminals 142 housed in the lower terminal housing portions 113.

The upper plug terminal 141 is a component formed in such a manner that, e.g., a metal plate material is bent. The upper plug terminal 141 has, on the base end side thereof, the coupling portion 141*b* which is to be connected to the connection terminal 212 of the FPC 200, and has, on a tip end side thereof, a contact portion 141*a* which is to contact the receptacle terminal 320.

The coupling portion 141*b* extends downward of a back end side of the contact portion 141*a*, and is bent backward in the middle. The coupling portion 141*b* and the connection terminal 212 of the FPC 200 are connected to each other by, e.g., soldering (see FIG. 1). The length of the coupling portion 141*b* in the upper-lower direction is set equal to a height from an upper surface of the FPC 200 to the upper terminal housing portion 112. Moreover, the coupling portion 141*b* protrudes outward of a back surface of the housing 110 (see FIGS. 1 and 2). The contact portion 141*a* extends in the front-back direction. The contact portion 141*a* is in a tubular shape opening upward, and at a tip end thereof, is in a clip shape. The contact portion 141*a* is configured to be housed in the upper terminal housing portion 112, and is configured such that the tip end of the contact portion 141*a* sandwiches or presses the receptacle terminal 320 in a state in which the plug connector 100 is fitted in the receptacle connector 300.

As in the upper plug terminal 141, the lower plug terminal 142 has the coupling portion 142*b* on the base end side and a contact portion 142*a* on a tip end side. The contact portion 142*a* is housed in the lower terminal housing portion 113, and the shape thereof is similar to that of the contact portion 141*a* of the upper plug terminal 141. Moreover, the coupling portion 142*b* extends downward of a back end side of the contact portion 142*a*, and is bent backward in the middle. The length of the coupling portion 142*b* in the upper-lower direction is set equal to a height from the upper surface of the FPC 200 to the lower terminal housing portion 113. The coupling portion 142*b* protrudes outward of the back surface of the housing 110 as in the coupling portion 141*b* of the upper plug terminal 141. Note that the coupling portion 142*b* of the lower plug terminal 142 is, in terms of a length in the front-back direction, shorter than the coupling portion 141*b* of the upper plug terminal 141. With this configuration, the connection terminals 212 of the FPC 200 arrayed in the two rows m the zigzag pattern and the coupling portions 141*b*, 142*b* of the upper plug terminals 141 and the lower plug terminals 142 can be connected close to each other. Accordingly, the FPC 200 and the plug connector 100 connected thereto can be reduced in size. Moreover, an increase in the number of pins and narrowing of a pitch in the plug connector 100 can be achieved.

[Configuration of FPC]

Figure 5A:
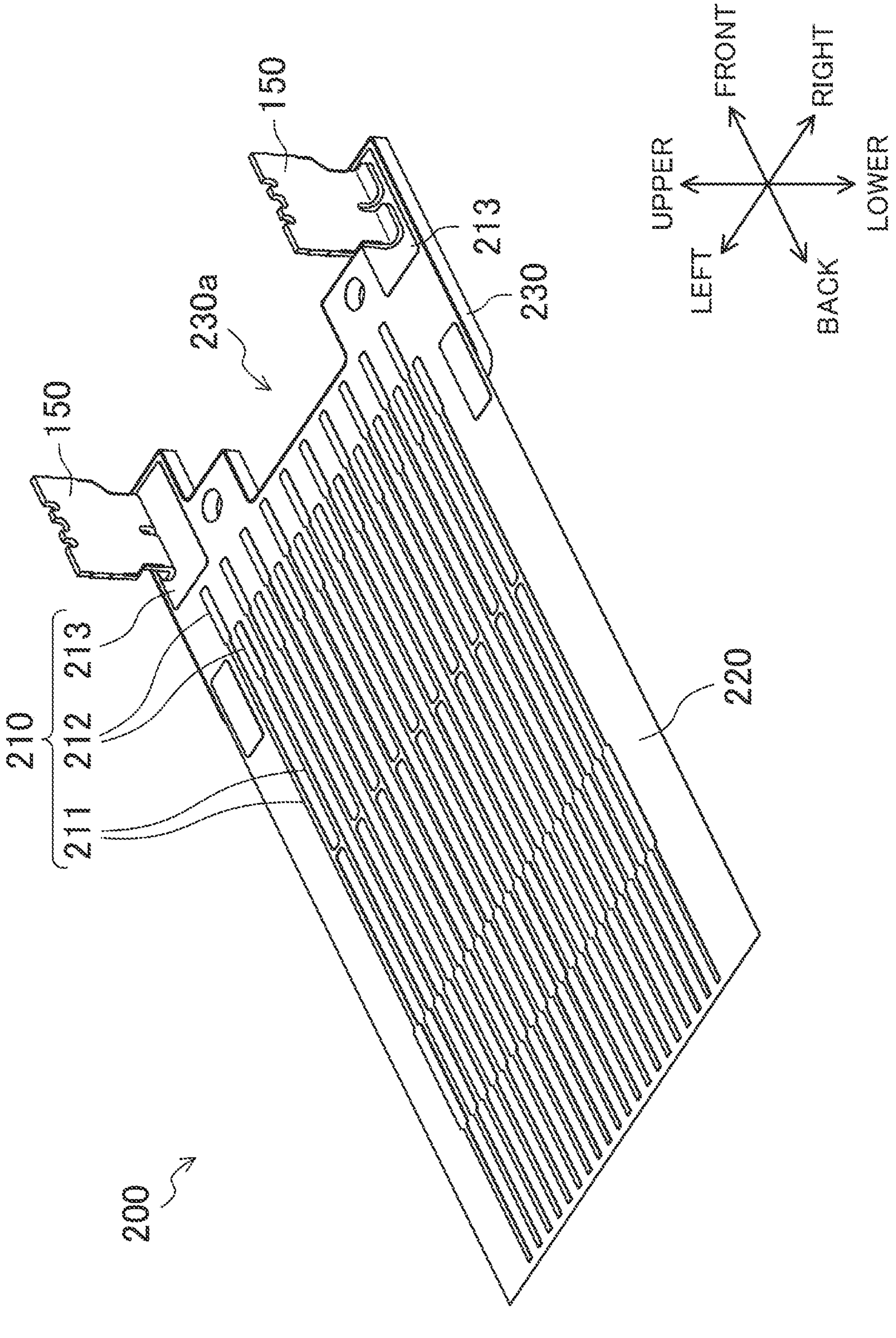
FIG. 5A is a perspective view of an FPC from above.
Figure 5B:
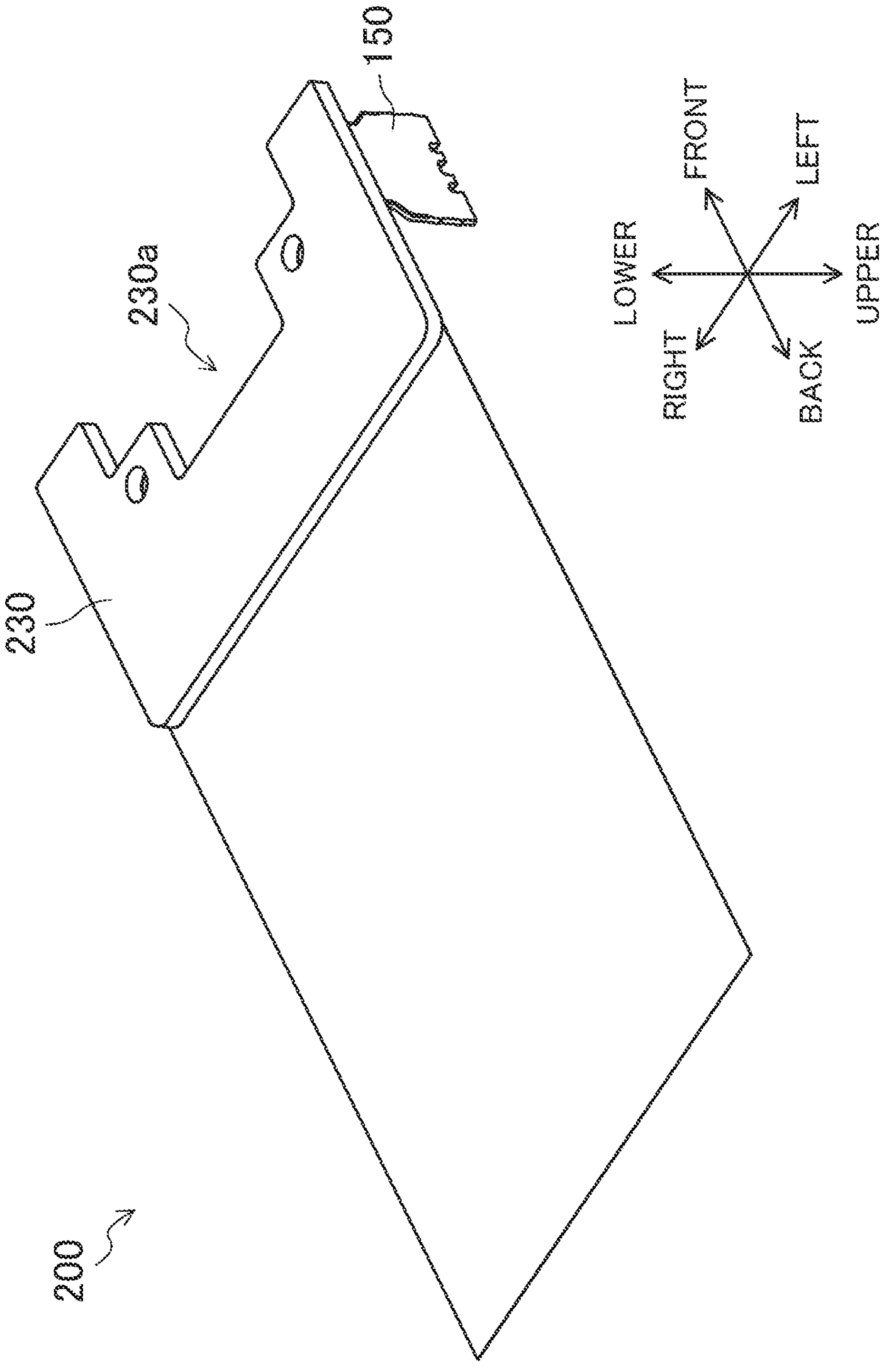
FIG. 5B is a perspective view of the FPC from below.

FIG. 5A shows a perspective view of the FPC, and FIG. 5B shows another perspective view of the FPC. Note that for the sake of convenience in description, FIGS. 5A and 5B show a state in which the fixing tools 150 are attached to the FPC 200.

As shown in FIGS. 5A and 5B, the FPC 200 is a sheet-shaped cable having the conductor pattern 210 and a support body 220. The support body 220 includes multiple insulating films, and the conductor pattern 210 is formed on an upper surface of one of these films. Moreover, a surface of the conductor pattern 210 is covered with and protected by the not-shown insulating film, except for the connection terminals 212 and the coupling terminals 213.

The conductor pattern 210 has 20 wirings 211 provided at predetermined intervals along the right-left direction and the connection terminals 212 each provided at front end portions of the wirings 211. Of the 20 wirings 211, the even number-th wirings 211 from a right end extend forward of the odd number-th wirings 211 as shown in FIG. 5A. The connection terminals 212 provided at the even number-th wirings 211 are arrayed in line along the right-left direction. The connection terminals 212 provided at the odd number-th wirings 211 are arrayed in line along the right-left direction, but are arrayed at the back of the connection terminals 212 provided at the even number-th wirings 211. That is, the connection terminals 212 of the conductor pattern 210 are arrayed in the two rows in the zigzag pattern.

The connection terminals 212 provided at the even number-th wirings 211 are each connected to the coupling portions 142*b* of the lower plug terminals 142, and the connection terminals 212 provided at the odd number-th wirings 211 are each connected to the coupling portions 141*b* of the upper plug terminals 141.

Note that in the present embodiment, adjacent ones of the odd number-th wirings 211 and the even number-th wirings 211 from the right end are connected to each other in the middle and have the same potential. However, the present disclosure is not limited to above, and these wirings may be electrically separated from each other.

The conductor pattern 210 has the coupling terminals 213. The coupling terminals 213 are provided on both right and left sides of the connection terminals 212 at the front of the connection terminals 212, and are connected to the fixing tools 150 attached to the housing 110.

The reinforcement plate 230 is attached to a lower surface of the FPC 200. The reinforcement plate 230 is a plate-shaped component made of, e.g., glass epoxy resin or stainless steel. As viewed from above, the reinforcement plate 230 is attached to the lower side of the connection terminals 212 and the coupling terminals 213. Moreover, the reinforcement plate 230 is bonded to a lower surface of the support body 220 with, e.g., an adhesive.

In a state in which the reinforcement plate 230 is attached to the FPC 200, the multiple plug terminals 140 provided at the plug connector 100 are each connected to the connection terminals 212 of the FPC 200, and the fixing tools 150 attached to the housing 110 are each connected to the coupling terminals 213 of the FPC 200. The reinforcement plate 230 supports and reinforces, from below, the connection terminals 212 and the coupling terminals 213 of the FPC 200, and therefore, connection and coupling among the above-described terminals can be reliably made.

In a state in which the reinforcement plate 230 is attached to the FPC 200 and the FPC 200 is connected to the plug connector 100, the plug connector 100 is fitted in the receptacle connector 300, and accordingly, both connectors are connected to each other. A cutout portion 230*a* provided at the front of the reinforcement plate 230 corresponds the shape of a raised portion 314 (see FIG. 6B) provided on an inner wall surface of a lower portion of the body 310. The shape of the cutout portion 230*a* is set such that when the plug connector 100 is fitted in the receptacle connector 300, the raised portion 314 is fitted in the cutout portion 230*a*.

[Configurations of Receptacle Connector and CPA]

Figure 6A:
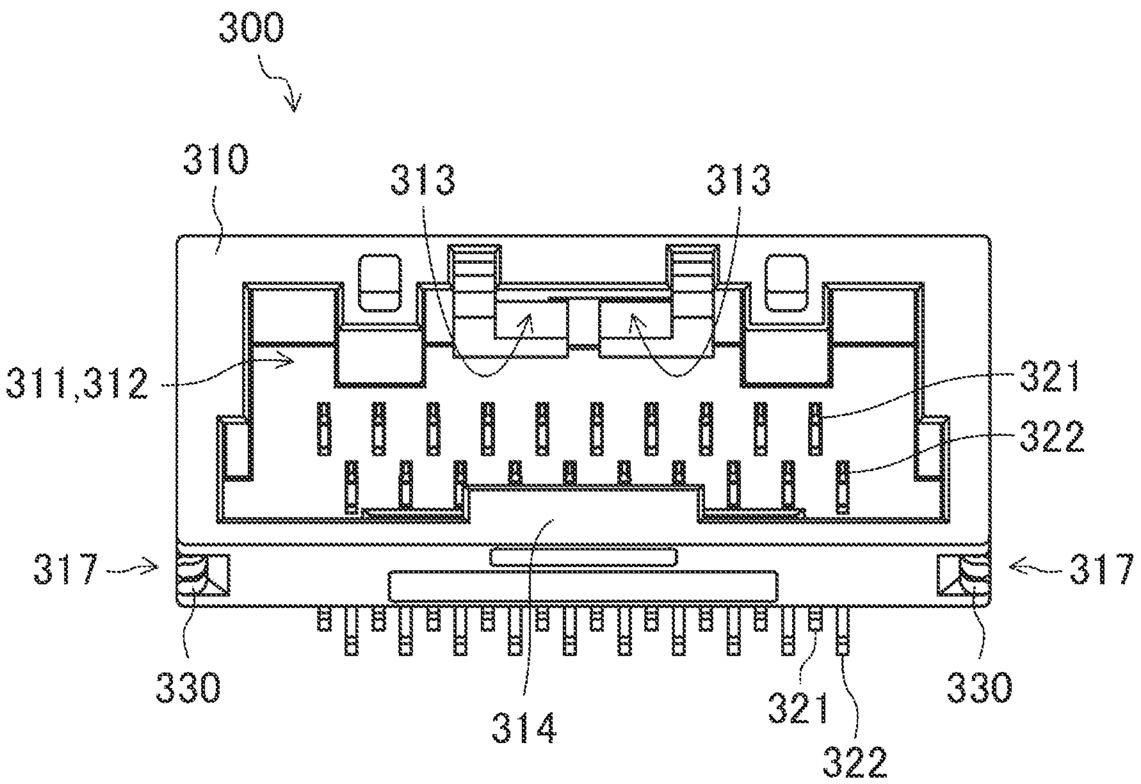
FIG. 6A is a perspective view of a receptacle connector.
Figure 6B:
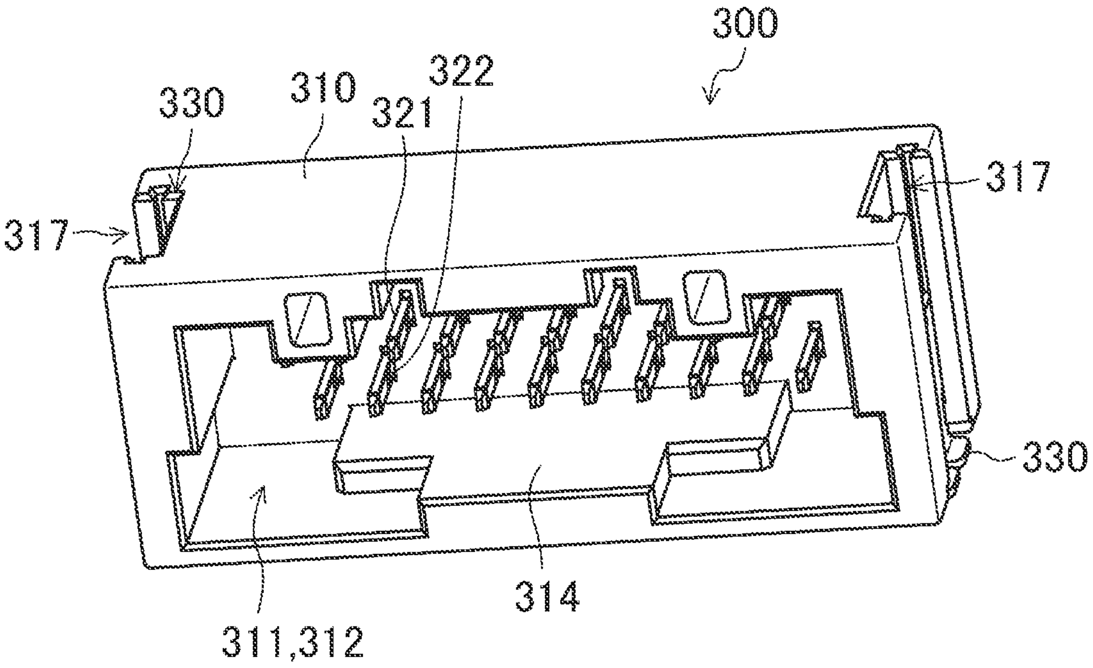
FIG. 6B is another perspective view of the receptacle connector.
Figure 6B:
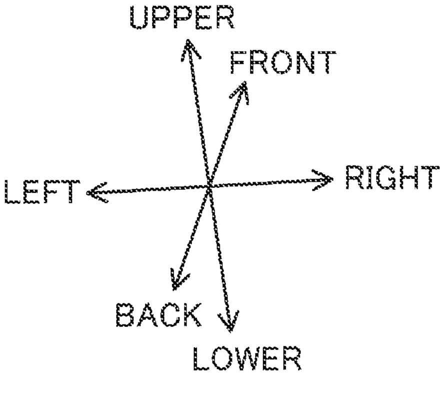
Figure 6C:
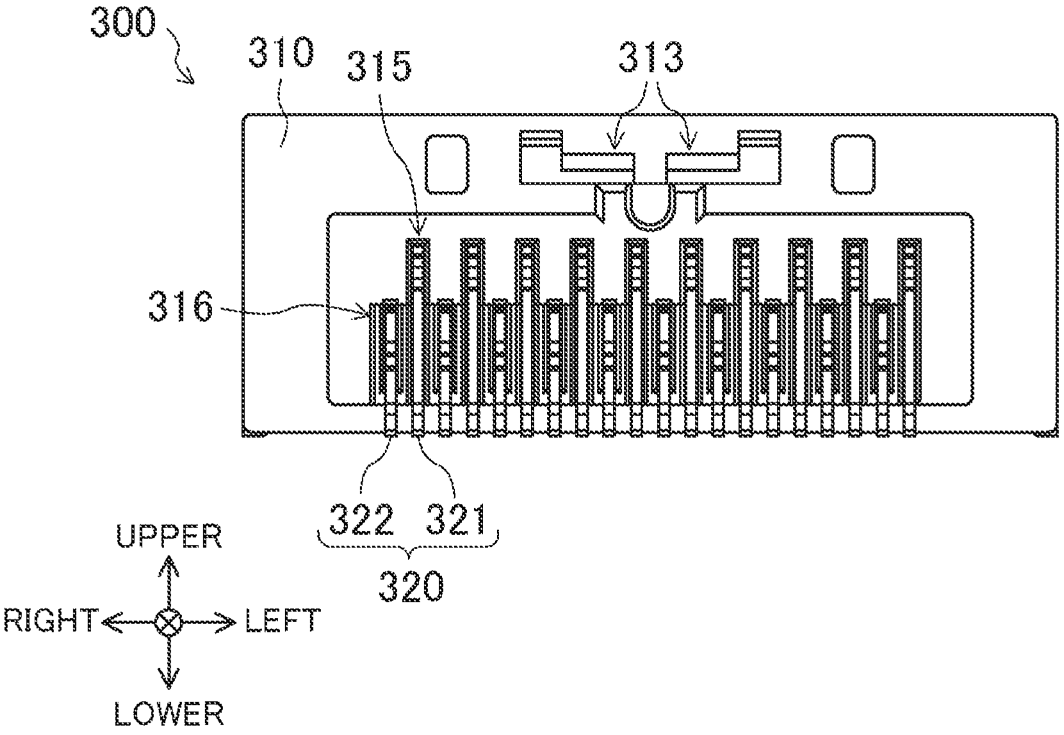
FIG. 6C is a view of the receptacle connector from the front.
Figure 7:
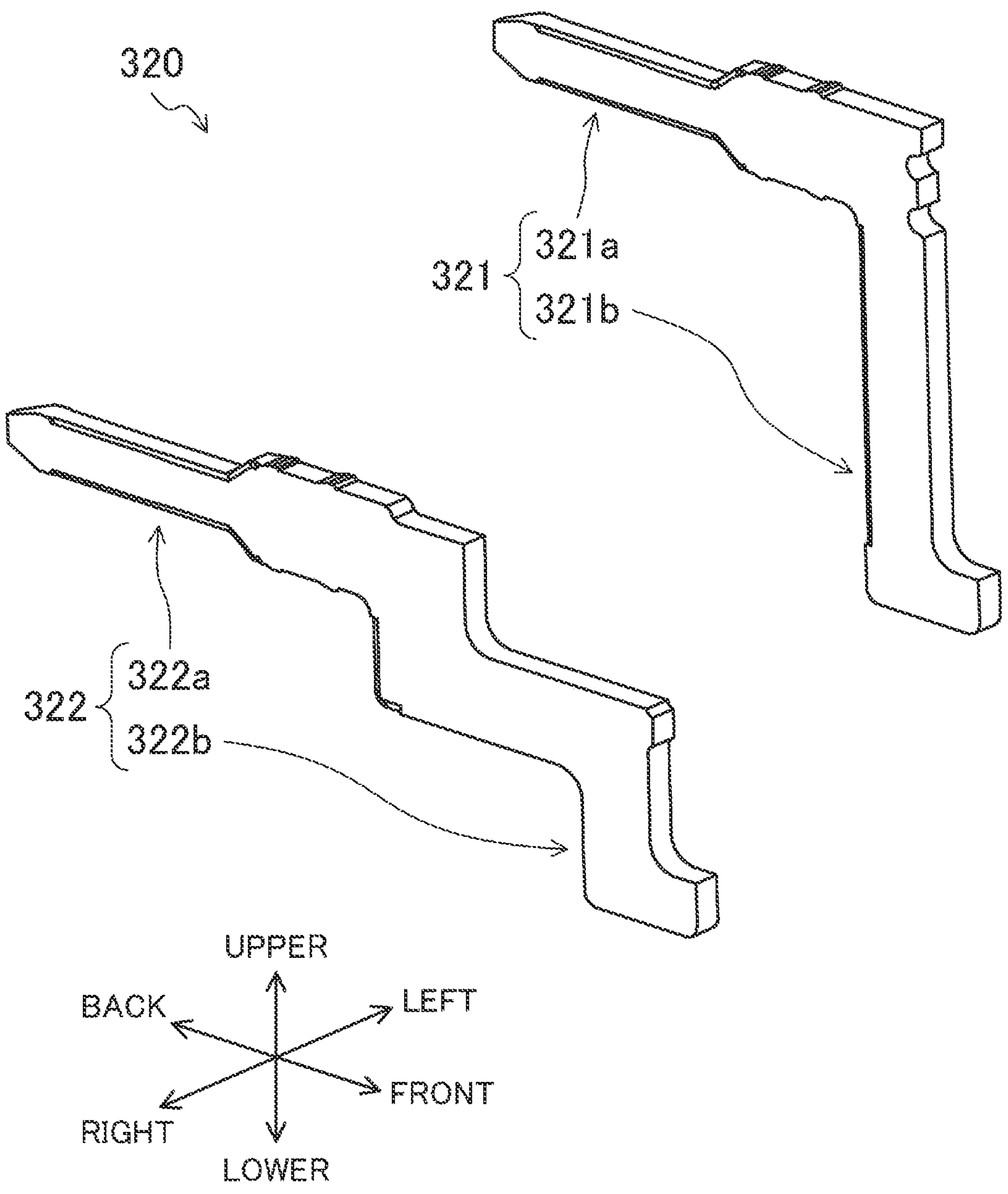
FIG. 7 is a perspective view of a receptacle terminal.
Figure 8:
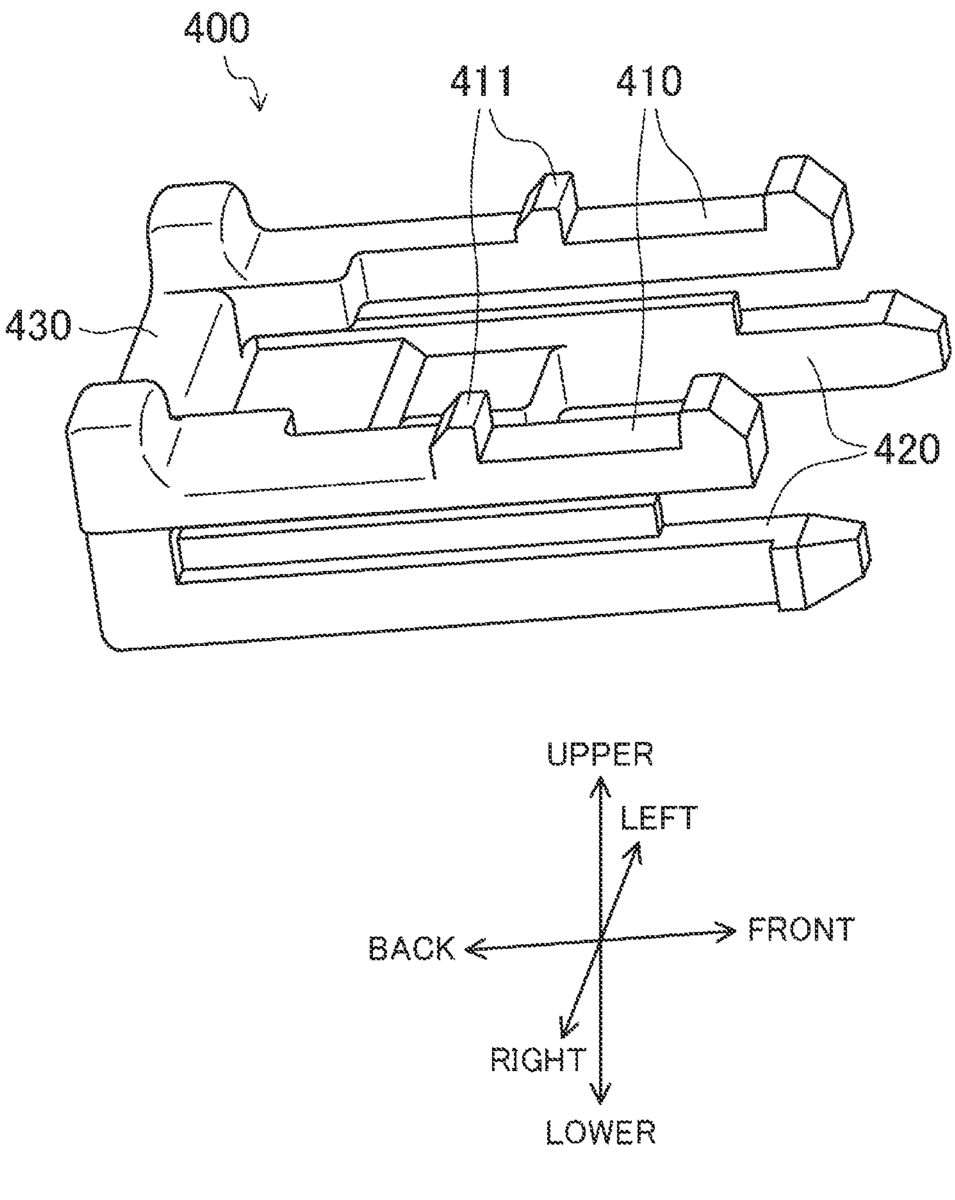
FIG. 8 is a perspective view of a CPA.

FIG. 6A shows a perspective view of the receptacle connector. FIG. 6B shows another perspective view of the receptacle connector, and FIG. 6C shows the receptacle connector from the front. FIG. 7 shows a perspective view of receptacle terminals. Moreover. FIG. 8 shows a perspective view of the CPA. Note that for the sake of convenience in description, FIGS. 6A to 6C show a state in which fixing tools 330 are attached to the body 310.

As shown in FIGS. 6A to 6C, the receptacle connector 300 has the body 310 and the multiple receptacle terminals 320.

The body 310 is a box-shaped component molded from a resin material. The body 310 has an opening 311 at the back, and is provided with a plug housing portion 312 inside. As shown in FIG. 6C, multiple upper terminal insertion holes 315 and multiple lower terminal insertion holes 316 are formed at a front surface of the body 310. The multiple upper terminal insertion holes 315 are provided at 10 locations at predetermined intervals in the right-left direction at the front surface of the body 310, and upper receptacle terminals 321 (see FIG. 7) are each inserted into the multiple upper terminal insertion holes 315. Moreover, the multiple lower terminal insertion holes 316 are provided at 10 locations at predetermined intervals in the right-left direction at the front surface of the body 310, and lower receptacle terminals 322 (see FIG. 7) are each inserted into the multiple lower terminal insertion holes 316. Note that the lower terminal insertion hole 316 is provided with a clearance from the upper terminal insertion hole 315 in the upper-lower direction, and as viewed from the front, the multiple upper terminal insertion holes 315 and the multiple lower terminal insertion holes 316 are arrayed in two rows in a zigzag pattern.

Fixing tool support portions 317 are formed at both right and left side surfaces of the body 310. The fixing tool 330 is a component formed in such a manner that a plate-shaped metal member is bent downward. In a state in which the fixing tool 330 is attached to the fixing tool support portion 317 of the body 310, a lower surface of the fixing tool 330 is parallel with a lower surface of the body 310. Moreover, in this state, aside surface of the fixing tool 330 contacts the side surface of the body 310.

A pair of slits into which the fixing tool 330 is to be inserted is provided at the fixing tool support portion 317. Both front and back end portions of the fixing tool 330 are inserted into the slits, and accordingly, the fixing tool 330 is attached to the fixing tool support portion 317. Moreover, the fixing tool 330 attached to the fixing tool support portion 317 is connected to a predetermined location of the not-shown circuit board by, e.g., soldering, and accordingly, the receptacle connector 300 is firmly fixed to the circuit board.

As shown in FIGS. 6A and 6C, the hook receiving portions (the stopping portions) 313 are provided at an upper portion of an inner wall surface of the body 310. Moreover, as shown in FIGS. 6A and 6B, the raised portion 314 formed in a T-shape as viewed from above is provided at a lower portion of the inner wall surface of the body 310.

As described above, when the plug connector 100 is fitted in the receptacle connector 300, the hooks 122 provided at the plug connector 100 are hooked on the hook receiving portions 313, and accordingly, the plug connector 100 is stopped at the receptacle connector 300 and both connectors are locked. Moreover, the raised portion 314 is fitted in the cutout portion 230*a* provided at the reinforcement plate 230, and accordingly, the positions of the FPC 200 and the plug connector 100 are restricted in the plug housing portion 312.

As shown in FIG. 7, the multiple receptacle terminals 320 have the multiple upper receptacle terminals 321 and the multiple lower receptacle terminals 322.

The upper receptacle terminal 321 is a component formed in such a manner that a metal plate material is bent. The upper receptacle terminal 321 has, on a base end side thereof, a coupling portion 321*b* which is to be connected to the not-shown circuit board, and has, on a tip end side thereof, a contact portion 321*a* which is to contact the plug terminal 140.

The coupling portion 321*b* extends forward of a front end side of the contact portion 321*a*, is bent downward in the middle, and is bent again to extend forward. The coupling portion 321*b* is, by, e.g., soldering, connected to a connection terminal of the not-shown circuit board. Moreover, the coupling portion 321*b* protrudes outward of the front surface of the body 310. The contact portion 321*a* is in a plate shape extending in the front-back direction. The contact portion 321*a* is inserted into the upper terminal insertion hole 315, and is housed in the plug housing portion 312 of the body 310. In addition, in a state in which the plug connector 100 is fitted in the receptacle connector 300, a tip end of the contact portion 321*a* is sandwiched or pressed by the plug terminal 140.

As in the upper receptacle terminal 321, the lower receptacle terminal 322 has a coupling portion 322*b* on a base end side and a contact portion 322*a* on a tip end side. The shape of the contact portion 322*a* is similar to that of the contact portion 321*a* of the upper receptacle terminal 321, and the contact portion 322*a* is housed in the plug housing portion 312 of the body 310. Moreover, the coupling portion 322*b* extends forward of a front end side of the contact portion 322*a*, is bent downward in the middle, and is bent again to extend forward. As in the coupling portion 321*b* of the upper receptacle terminal 321, the coupling portion 322*b* protrudes outward of the front surface of the body 310. A lower end of the coupling portion 321*b* of the upper receptacle terminal 321 is set to a position on the same plane as that of a lower end of the coupling portion 322*b* of the lower receptacle terminal 322. Moreover, the coupling portion 322*b* of the lower receptacle terminal 322 is, in terms of a length in the front-back direction, longer than the coupling portion 321*b* of the upper receptacle terminal 321. With this configuration, the lower ends of the coupling portions 321*b* of the upper receptacle terminals 321 and the lower ends of the coupling portions 322*b* of the lower receptacle terminals 322 can be arrayed in two rows in a zigzag pattern.

As shown in FIG. 8, the CPA 400 has the two upper arms 410 provided with a predetermined clearance in the right-left direction, the two lower arms 420 provided with a predetermined clearance below the upper arms 410, and a coupling portion 430 coupling back end portions of the two upper arms 410 and the two lower arms 420. The CPA 400 is a component molded from a resin material.

In a state in which the plug connector 100 is not properly fitted in the receptacle connector 300, the CPA 400 does not move forward, and is not housed in the body 310. Thus, protrusions 411 provided at the upper arms 410 of the CPA 400 can be viewed from above. On the other hand, when the plug connector 100 is properly fitted in the receptacle connector 300, the lower arms 420 are fitted in among the guide portions 117 of the housing 110 and the upper surface of the base portion 111, specifically the bottom surfaces of the recessed portions 115, as described above. Moreover, the upper arms 410 are, as described above, fitted in among the guide portions 117 of the housing 110 and the lever protection portions 118. Further, the lower side of the coupling portion 430 contacts the back surface of the base portion 111 of the housing 110. Accordingly, the CPA 400 moves forward, and the upper arms 410 and the lower arms 420 are housed in the body 310.

As described above, the position of the CPA 400 is visually checked so that it can be easily checked whether or not the plug connector 100 is properly fitted in the receptacle connector 300.

Note that in the present embodiment, the CPA 400 is provided, but is not essential and may be omitted. With the CPA 400, the force of binding between the receptacle connector 300 and the plug connector 100 can be enhanced.

[Method for Removing Connector Set]

Figure 9:
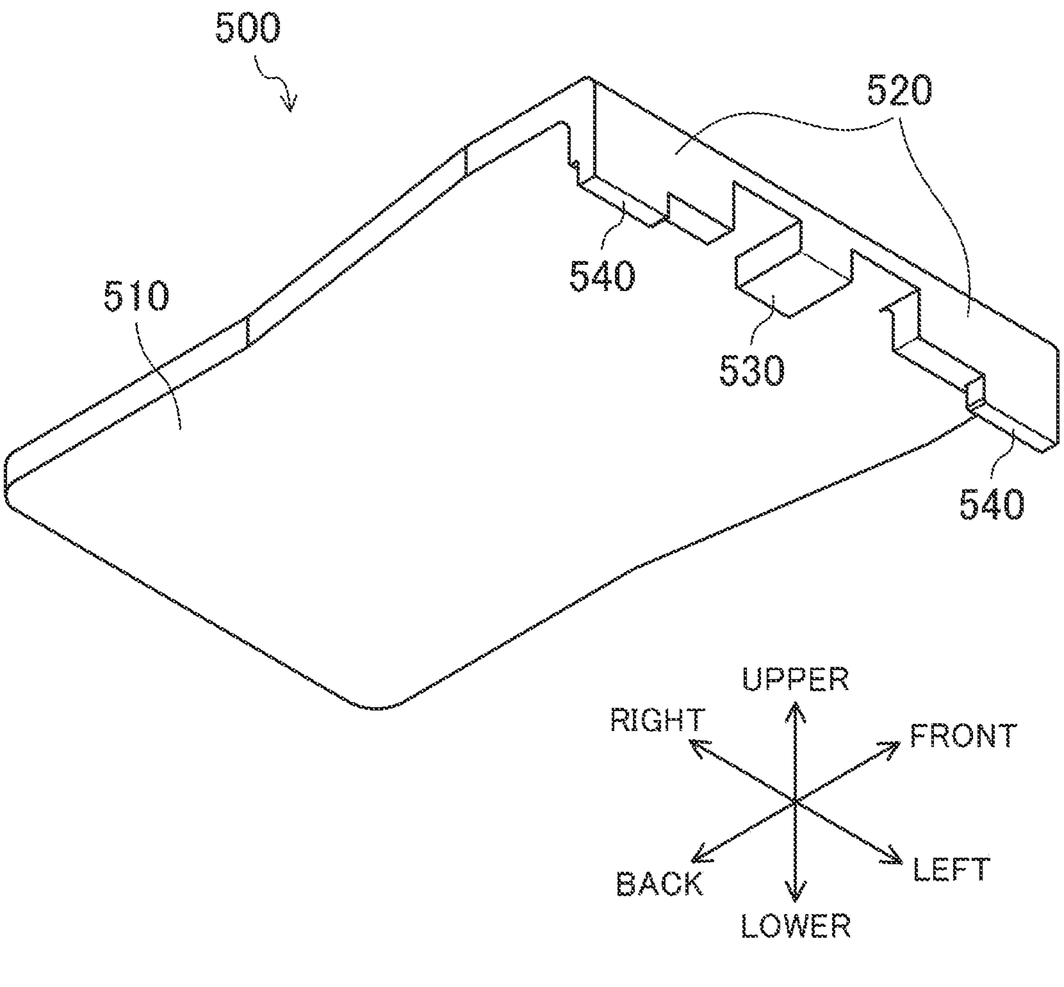
FIG. 9 is a perspective view of a removal tool.
Figure 10:
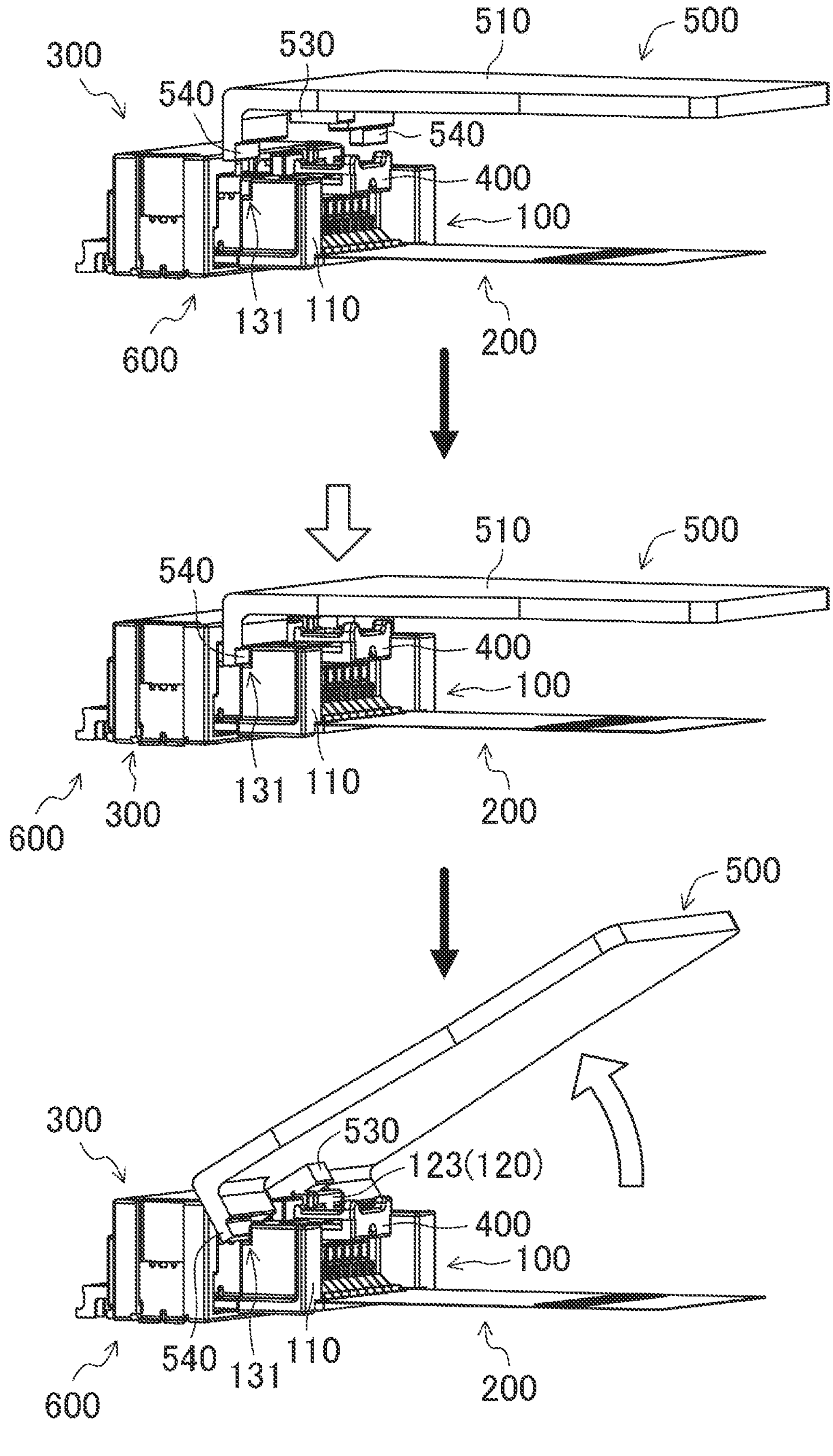
FIG. 10 is a view for describing the steps of removing the connector set.

FIG. 9 shows a perspective view of the removal tool, and FIG. 10 shows a view for describing the steps of removing the connector set.

As shown in FIG. 9, the tool 500 is a component having a flat plate-shaped substrate 510 and tip end portions 520, and is molded from a resin material. Note that in description below, a longitudinal direction of the tool 500 is the above-described front-back direction, a lateral direction of the tool 500 is the right-left direction, and a direction in which the tip end portions 520 and the housing pressing portion 540 extend is the upper-lower direction.

The tip end portions 520 are provided such that a front end of the substrate 510 is bent on both right and left sides to extend downward. Moreover, a button pressing portion 530 extending backward and downward of the front end is provided at a lower surface of the substrate 510. The tip end portions 520 and the button pressing portion 530 are provided with predetermined clearances in the right-left direction, and as viewed from the front, a portion between the tip end portion 520 and the button pressing portion 530 is in a cutout shape. The housing pressing portion 540 extending downward is provided at each tip end portion 520. The housing pressing portion 540 is thinner than the tip end portion 520 in the front-back direction, and a front end surface thereof is flush with the tip end portion 520. Since the tip end portion 520 is thicker than the housing pressing portion 540, the strength of the tool 500 can be ensured. Note that the thickness of the tip end portion 520 may be the same as the thickness of the housing pressing portion 540. Moreover, an inner corner portion of the tip end portion 520 is in a C-chamfered shape. With this configuration, the probability of the tool 500 being caught when the tool 500 is pressed downward with the tool 500 being set to the plug connector 100 is decreased, and such pressing is facilitated.

Using the tool 500 shown in FIG. 9, the plug connector 100 can be easily removed from the receptacle connector 300.

As shown on the uppermost side in FIG. 10, the tool 500 is set to the housing 110 in parallel with an upper surface of the housing 110, i.e., the upper surfaces of the peripheral wall portions 114 of the base portion 111 in this case, in a state in which the plug connector 100 is fitted in the receptacle connector 300 (a tool arrangement step).

Next, as shown at the center in FIG. 10, the housing pressing portions 540 are fitted in the step portions 131 provided at the side portions 130 of the housing 110. When the tool 500 is pressed down, a lower surface of the button pressing portion 530 contacts the upper surface of the release button 123, and accordingly, the release button 123 is pressed down. When the tool 500 is further pressed down, lower surfaces of the housing pressing portions 540 contact the bottom surfaces 131*a* of the step portions 131. At this point, the tool 500 does not press the lever protection portions 118 and damage of the lever protection portions 118 is avoided because the portion between the button pressing portion 530 and the tip end portion 520 is in the cutout shape. By pressing down the release button 123, the hooks 122 provided at the lever 121 are displaced downward, and the hooks 122 and the hook receiving portions 313 are released from each other (an unlocking step).

As shown on the lowermost side in FIG. 10, when the back of the tool 500 is lifted in a state in which the tool 500 presses down the housing 110, backward-upward force obliquely acts on the tip end portions 520 and the housing pressing portions 540 about a supporting point which is a contact portion between the tool 500 and the body 310. Accordingly, the housing 110 contacting the housing pressing portions 540 moves backward. In this manner, the plug connector 100 is removed from the receptacle connector 300 (a removal step).

[Advantageous Effects Etc.]

As described above, the plug connector 100 according to the present embodiment includes the housing 110 and the multiple plug terminals 140 arranged on the housing 110. Note that the multiple plug terminals 140 are, on the tip end side thereof, housed in the housing 110 and are, on the base end side thereof, arranged to protrude from the back surface of the housing 110.

The housing 110 has at least the base portion 111 housing the multiple plug terminals 140, the lock mechanism 120 configured to stop at the receptacle connector 300 when fitted in the receptacle connector 300, and the pair of side portions 130 provided on both right and left sides of the base portion 111. Note that the tip end side of the multiple plug terminals 140 is housed in the base portion 111. At least the pair of side portions 130 provided to extend from the side surfaces of the base portion 111 on both right and left sides is provided. Moreover, the pair of side portions 130 is provided to further extend backward of both right and left side surfaces of the base portion 11 and surround the base end side of the multiple plug terminals 140 from both right and left sides.

The front surface (a first surface) 132 of each of the side portions 130 in a pair is a surface extending upward. Moreover, the step portion 131 is formed at each side portion 130. The bottom surface 131*a* of the step portion 131 extends backward continuously to the front surface 132 of the side portion 130, and on the other hand, the side surface (a second surface) 131*b* of the step portion 131 extends upward continuously to the bottom surface 131*a* and is continuous to the upper surface of the side portion 130. Further, the side surface (the second surface) 131*b* of the step portion 131 is positioned forward of the back surface of the base portion 111 and backward of the front surface (the first surface) 132 of the side portion 130.

In a state in which the plug connector 100 is fitted in the receptacle connector 300, the side surfaces 131*b* of the step portions 131 face the receptacle connector 300 through the clearance. Moreover, the front surfaces 132 of the side portions 130 are closer to the receptacle connector 300 (specifically, the body 310) than the side surfaces 131*b* of the step portions 131 are to the receptacle connector 300.

When the plug connector 100 is fitted in the receptacle connector 300, the front surfaces 132 of the side portions 130 of the housing 110 come close to the receptacle connector 300. Thus, the tool 500 is operated in contact with the step portions 131 provided on the front end side and the upper end side of the side portions 130, and accordingly, contacts the receptacle connector 300. Thus, backward movement force can act on the plug connector 100. In this manner, the plug connector 100 can easily removed from the receptacle connector 300.

Particularly, in a case where the plug connector 100 is small and has many pins, removal of the plug connector 100 is facilitated as compared to, e.g., typical configurations disclosed in Patent Documents 1 to 4.

The lock mechanism 120 has at least the lever 121 supported in the cantilever manner at the front of the base portion 111, the release button 123 protruding upward of the upper surface of the lever 121 and provided at the back of the lever 121, and the hooks 122 protruding upward of the upper surface of the lever 121 and provided at the front of the release button 123 with the predetermined clearance from the release button 123.

With this configuration of the lock mechanism 120, the plug connector 100 and the receptacle connector 300 can be reliably locked to each other by operation of the release button 123. Moreover, unlocking can be easily performed.

As viewed from above, the front surfaces 132 of the pair of side portions 130 are provided flush with the front surface of the release button 123.

Each of the multiple plug terminals 140 has the coupling portions 141*b*, 142*b* protruding backward from the back surface of the base portion 111 and connected to the wiring 211 of the FPC 200 and the contact portions 141*a*, 142*a* to be electrically connected to the receptacle terminal 320 of the receptacle connector 300. Moreover, the wiring 211 is supported on the support body 220.

Each plug terminal 140 is connected to the wiring 211 of the FPC 200, and the plug connector 100 is fitted in the FPC 200. Accordingly, the wirings 211 of the FPC 200 are each electrically connected to the multiple receptacle terminals 320 provided at the receptacle connector 300.

The connector set 600 according to the present embodiment is configured such that the plug connector 100 and the receptacle connector 300 are connected to each other.

The receptacle connector 300 has at least the box-shaped body 310 having the opening 311 at the back surface and the multiple receptacle terminals 320 housed in the body 310 on the tip end side and arranged to protrude from the front surface of the body 310 on the base end side.

The hook receiving portions (the stopping portions) 313 at which the lock mechanism 120 is stoppable are provided at the inner wall surface of the upper portion of the body 310.

The front of the plug connector 100 is housed in the body 310, and the multiple plug terminals 140 and the multiple receptacle terminals 320 are electrically connected to each other through contact among the tip ends thereof.

With this configuration of the connector set 600, the plug connector 100 is fitted in the receptacle connector 300 so that both connectors can be reliably locked to each other and the multiple plug terminals 140 provided at the plug connector 100 can be each electrically connected to the multiple receptacle terminals 320 provided at the receptacle connector 300.

For example, according to the connector set 600 of the present embodiment, the FPC 200 can be connected to the plug connector 100 to electrically connect the circuit board (not shown) connected to the FPC 200 or the electronic component (not shown) mounted thereon and the circuit board (not shown) connected to the receptacle connector 300 or the electronic component (not shown) mounted thereon, thereby forming the electric circuit. At this point, since insertion/removal of the plug connector 100 is facilitated, the electric circuit can be easily formed.

By operation of the lock mechanism 120, the plug connector 100 and the receptacle connector 300 can be easily locked to or unlocked from each other.

The method for removing the connector set 600 according to the present embodiment includes the tool arrangement step, the unlocking step, and the removal step. At the tool arrangement step, the tool 500 is set to the housing 110 in parallel with the upper surface of the base portion 111 of the housing 110. At the unlocking step, the housing pressing portions 540 provided at the tool 500 contact the bottom surfaces 131*a* of the step portions 131. Further, the button pressing portion 530 provided at the tool 500 presses down the release button 123 of the lock mechanism 120, and accordingly, the hooks 122 provided at the lock mechanism 120 and the hook receiving portions (the stopping portions) 313 provided at the body 310 are released from each other.

At the removal step, the back of the tool 500 is, after the unlocking step, lifted with the housing 110 being pressed down, and the housing 110 is moved backward to pull the plug connector 100 out of the receptacle connector 300.

According to the present method, the tool 500 is pressed down with the button pressing portion 530 of the tool 500 contacting the release button 123, and in this manner, the lock mechanism 120 and the hook receiving portions 313 can be easily released from each other. Moreover, the housing 110 contacting the housing pressing portions 540 can be moved backward about the supporting point which is the contact portion between the tool 500 and the body 310. Accordingly, the plug connector 100 can be easily pulled out of the receptacle connector 300.

Moreover, according to the present method, the plug connector 100 can be pulled out without the need for directly gripping the FPC 200, and therefore, no extra force is applied to the FPC 200. Thus, disconnection of the wirings 211 and disconnection of the connection terminals 212 and the plug terminals 140 can be avoided, and degradation of the reliability of connection between the FPC 200 and the plug connector 100 can be reduced. Moreover, the present method can easily handle a case where it is difficult to remove the plug connector 100 with a human hand because the connector set 600 is small.

(Other Embodiments)

Figure 11:
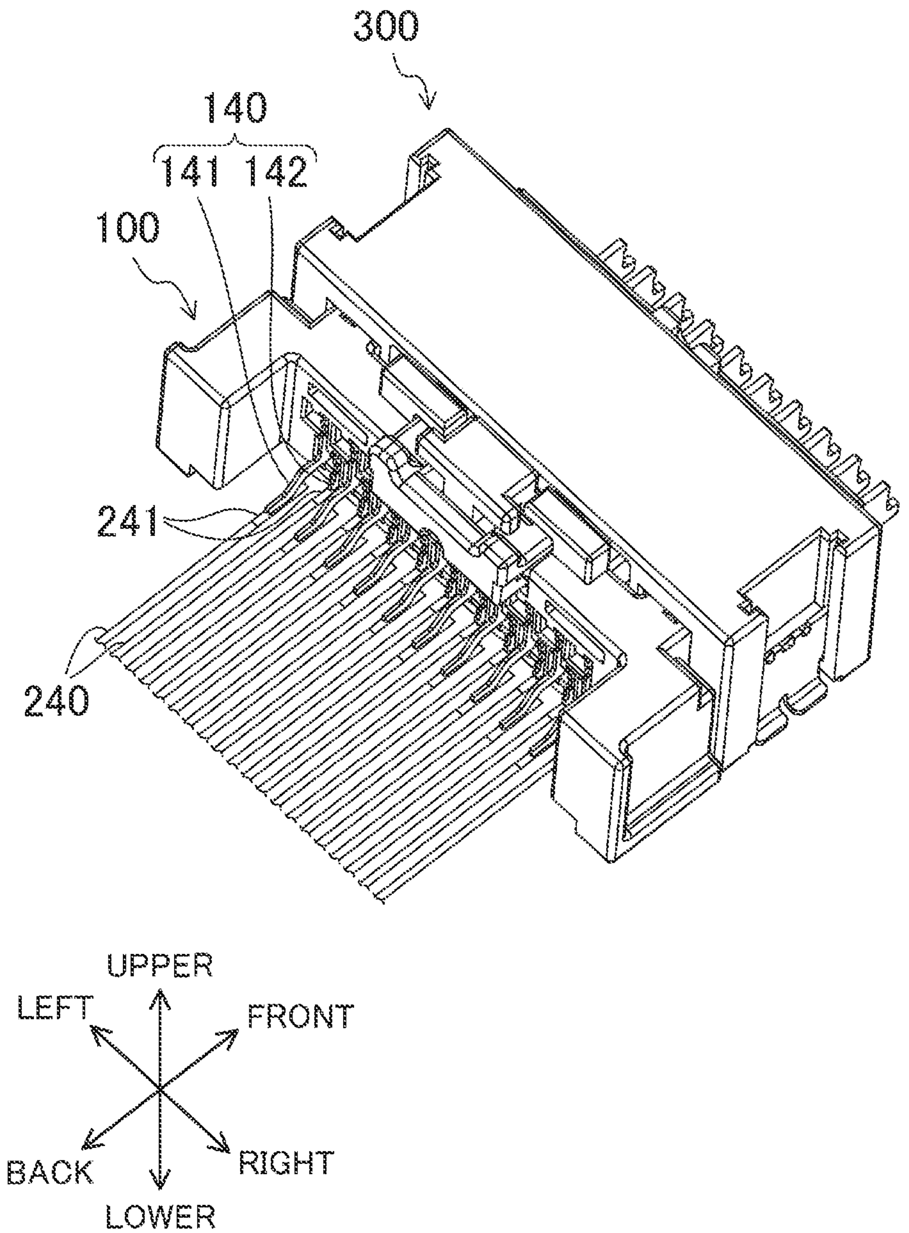
FIG. 11 is a perspective view of another plug connector.

Note that in the above-described embodiment, the example where the FPC 200 is connected to the plug connector 100 has been described. However, a flexible flat cable (FFC) may be connected to the plug connector 100. The present disclosure is not limited to above, and as shown in, e.g., FIG. 11, multiple separate wirings 240 may be connected to the plug connector 100. In this case, the wiring 240 is configured such that a not-shown conductive wire is coated with an insulating film, and a connection component 241 for the plug terminal 140 is attached to a tip end portion of the wiring 240 from which the insulating film has been removed. The connection component 241 and the plug terminal 140 are connected to each other. Although not shown in the figure, the multiple wirings 240 may be supported on a support substrate, or may be bound to each other.

Figure 12:
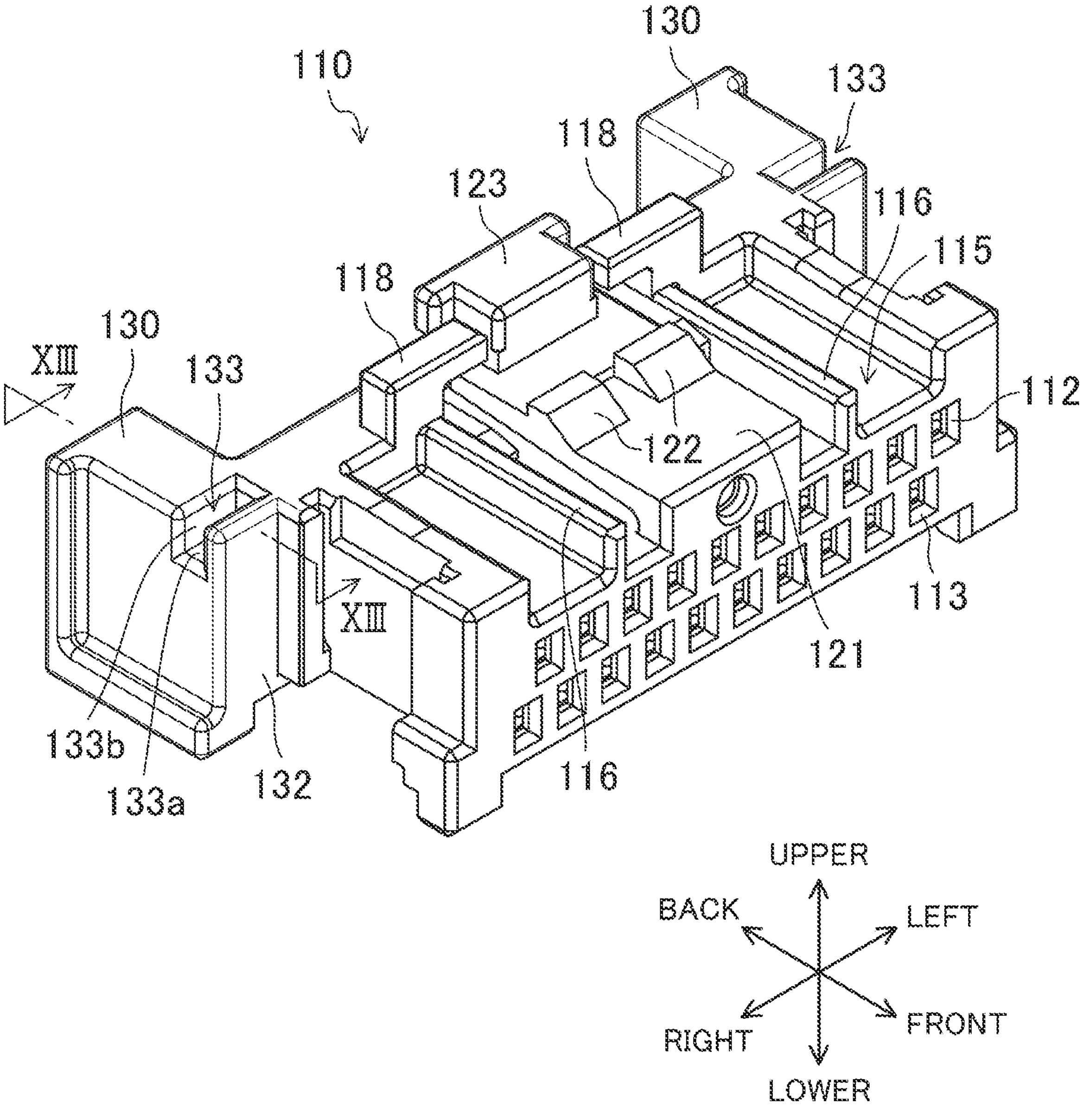
FIG. 12 is a perspective view of another housing.
Figure 13:
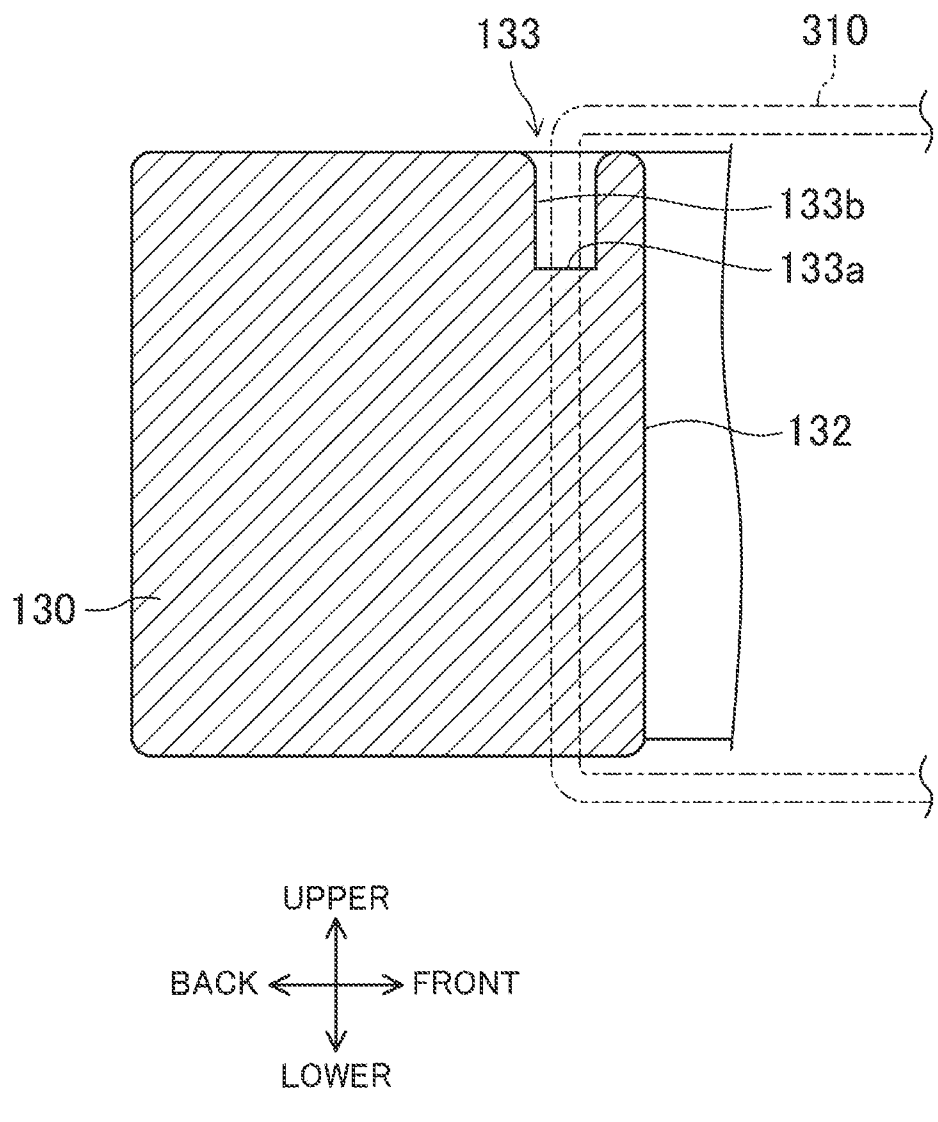
FIG. 13 is a schematic sectional view along an XIII-XIII line of FIG. 12.

Moreover, in the above-described embodiment, the step portions 131 are provided at the side portions 130 of the housing 110, and when the plug connector 100 is pulled out of the receptacle connector 300, the housing pressing portions 540 of the tool 500 are inserted into the step portions 131. However, e.g., recessed portions 133 may be provided instead of the step portions 131, as shown in FIGS. 12 and 13.

In this case, a bottom surface 133*a* of the recessed portion 133 is equivalent to the bottom surface 131*a* of the step portion 131 shown in FIGS. 2 to 3D, and an inner wall surface (a second surface) 133*b* of a back portion of the recessed portion 133 is equivalent to the side surface 131*b* of the step portion 131. That is, the inner wall surface 133*b* of the back portion of the recessed portion 133 is positioned forward of the back surface of the base portion 111 and backward of the front surface 132 of the side portion 130. Moreover, in a state in which the plug connector 100 is fitted in the receptacle connector 300, the inner wall surfaces 133*b* of the back portions of the recessed portions 133 face the receptacle connector 300 through a clearance. Further, the front surface 132 of the side portion 130 is closer to the receptacle connector 300 (specifically, the body 310) than the inner wall surface 133*b* of the back portion of the recessed portion 133 is to the receptacle connector 300.

As described above, advantageous effects similar to those of the embodiment are also provided in the case of providing the recessed portions 133 instead of the step portions 131, needless to say. As shown in FIG. 13, in a state in which the plug connector 100 is fitted in the receptacle connector 300, the recessed portion 133 may enter halfway into the body 310. In this case, the inner wall surfaces 133*b* of the back portions of the recessed portions 133 also face the receptacle connector 300 through the clearance. Note that as in the above-described embodiment, the front surfaces 132 of the side portions 130 may come close to or contact the body 310.

The bottom surface 131*a* of the step portion 131 and the bottom surface 133*a* of the recessed portion 133 are not necessarily flat surfaces, and for example, may be curved surfaces recessed downward.

The number of terminals in the plug connector 100 and the receptacle connector 300 is not specifically limited to that described in the embodiment, and other values may be employed as necessary. Moreover, the terminals of each of the plug connector 100 and the receptacle connector 300 may be arrayed in a single row.

INDUSTRIAL APPLICABILITY

The plug connector of the present disclosure is useful because a small plug connector easily removable from a receptacle connector and having many pins can be provided.

DESCRIPTION OF REFERENCE CHARACTERS

100 Plug Connector
110 Housing
111 Base Portion
112 Upper Terminal Housing Portion
113 Lower Terminal Housing Portion
114 Peripheral Wall Portion
115 Recessed Portion
117 Guide Portion
118 Lever Protection Portion
119 Fixing Tool Support Portion
120 Lock Mechanism
121 Lever
122 Hook
123 Release Button
130 Side Portion
131 Step Portion
131*a* Bottom Surface of Step Portion
131*b* Side Surface (Second Surface) of Step Portion
132 Front Surface (First Surface) of Side Portion
133 Recessed Portion

133*a* Bottom Surface of Recessed Portion
133*b* Inner Wall Surface (Second Surface) of Back Portion of Recessed Portion
140 Plug Terminal
141 Upper Plug Terminal
141*a* Contact Portion
141*b* Coupling Portion
142 Lower Plug Terminal
142*a* Contact Portion
142*b* Coupling Portion
150 Fixing Tool
200 FPC
210 Conductor Pattern
211 Wiring
212 Connection Terminal
213 Coupling Terminal
220 Support Body
230 Reinforcement Plate
300 Receptacle Connector
310 Body
311 Opening
313 Hook Receiving Portion (Stopping Portion)
314 Raised Portion
315 Upper Terminal Insertion Hole
316 Lower Terminal Insertion Hole
317 Fixing Tool Support Portion
320 Receptacle Terminal
321 Upper Receptacle Terminal
321*a* Contact Portion
321*b* Coupling Portion
322 Lower Receptacle Terminal
322*a* Contact Portion
322*b* Coupling Portion
330 Fixing Tool
400 CPA (Connector Position Assurance Device)
410 Upper Arm
420 Lower Arm
430 Coupling Portion
500 Removal Tool (Tool)
510 Substrate
520 Tip End Portion
530 Button Pressing Portion
540 Housing Pressing Portion
600 Connector Set

The invention claimed is:

1. A plug connector to be fitted in a receptacle connector, comprising:
a housing; and
multiple plug terminals arranged in the housing,
wherein the housing has at least
a base portion housing the multiple plug terminals,
a lock mechanism configured to be stopped at the receptacle connector when fitted in the receptacle connector, and
a pair of side portions each provided on both right and left sides of the base portion,
at least one of the pair of side portions has
a first surface extending upward, and
a second surface positioned forward of a back surface of the base portion and backward of the first surface and extending upward, and
in a state in which the plug connector is fitted in the receptacle connector,
the second surface faces the receptacle connector through a clearance, and
the first surface is closer to the receptacle connector than the second surface is to the receptacle connector.

2. The plug connector according to claim 1, wherein
the lock mechanism has at least
a lever coupled to a front of the base portion and supported in a cantilever manner,
a release button protruding upward of an upper surface of the lever and provided at a back of the lever, and
a hook protruding upward of the upper surface of the lever and provided with a predetermined clearance from the release button at a front of the release button.

3. The plug connector according to claim 2, wherein
as viewed from above, a front surface of the release button is provided flush with the first surface of the pair of side portions.

4. The plug connector according to claim 1, wherein
each of the multiple plug terminals has
a coupling portion protruding backward of the back surface of the base portion and connected to a wiring, and
a contact portion electrically connected to a corresponding one of receptacle terminals of the receptacle connector.

5. The plug connector according to claim 4, wherein
the wiring is supported on a support body.

6. A connector set comprising:
the plug connector according to claim 1 and the receptacle connector, the plug connector and the receptacle connector being connected to each other,
wherein the receptacle connector has at least
a box-shaped body having an opening at a back surface, and
the multiple receptacle terminals arranged in the opening of the body,
a stopping portion at which the lock mechanism is stoppable is provided at an inner wall surface positioned at an upper portion of the body, and
in a state in which the plug connector is housed in the body, the multiple plug terminals are each electrically connected to the multiple receptacle terminals.

7. A method for removing a connector set in which a plug connector and a receptacle connector are connected to each other,
the plug connector including
a housing, and
multiple plug terminals arranged in the housing,
the housing having at least
a base portion housing the multiple plug terminals,
a lock mechanism configured to be stopped at the receptacle connector when fitted in the receptacle connector, and
a pair of side portions each provided on both right and left sides of the base portion,
at least one of the pair of side portions having
a first surface extending upward, and
a second surface positioned forward of a back surface of the base portion and backward of the first surface and extending upward,
in a state in which the plug connector is fitted in the receptacle connector,
the second surface facing the receptacle connector through a clearance, and
the first surface being closer to the receptacle connector than the second surface is to the receptacle connector, the receptacle connector having at least a box-shaped body having an opening at a back surface, and multiple receptacle terminals arranged in the opening of the body, a stopping portion at which the lock mechanism is stoppable being provided at an inner wall surface positioned at an upper portion of the body, in a state in which the plug connector is housed in the body, the multiple plug terminals being each electrically connected to the multiple receptacle terminals, the method comprising:

a tool arrangement step of setting a tool with a predetermined shape to the housing such that the tool is parallel with an upper surface of the base portion; and an unlocking step of releasing the lock mechanism and the stopping portion provided at the body from each other by inserting part of the tool along the second surface and pressing down the lock mechanism by the tool.

8. The method for removing the connector set according to claim 7, further comprising:

a removal step of pulling, after the unlocking step, the plug connector out of the receptacle connector by moving the housing backward in a state in which the housing is pressed down.

* * * * *